United States Patent

Fujii et al.

[11] Patent Number: 5,960,433
[45] Date of Patent: Sep. 28, 1999

[54] METHOD FOR DISPLAYING A DATA STRUCTURE OF A PROGRAM

[75] Inventors: Kunikazu Fujii, Ayase; Hideaki Shinomi, Kawasaki, both of Japan

[73] Assignee: International Business Machines Corporation, Armonk, N.Y.

[21] Appl. No.: 08/841,972

[22] Filed: Apr. 8, 1997

[30] Foreign Application Priority Data

Apr. 12, 1996 [JP] Japan ................................ 8-090744

[51] Int. Cl.⁶ ............................................... G06F 17/30
[52] U.S. Cl. ........................... 707/100; 707/3; 707/4; 707/101
[58] Field of Search ........................ 345/334; 395/708; 707/3, 4, 100, 101

[56] References Cited

U.S. PATENT DOCUMENTS

| | | | |
|---|---|---|---|
| 5,404,441 | 4/1995 | Satoyama | 345/334 |
| 5,432,942 | 7/1995 | Trainer | 395/708 |
| 5,634,024 | 5/1997 | Yamaguchi | 395/376 |

FOREIGN PATENT DOCUMENTS 7-230379  2/1994  Japan .

OTHER PUBLICATIONS

IBM Technical Disclosure Bulletin Visualization Method for Program Data Items, vol.37 No. 04B, Apr. 1994, pp.95–96.
"Visualization Method for Program Data Items", IBM Technical Disclosure Bulletin, vol. 37, No. 04B, Apr. 1994, pp. 95–96.

Primary Examiner—Wayne Amsbury
Assistant Examiner—Cheryl Lewis
Attorney, Agent, or Firm—Prentiss W. Johnson

[57] ABSTRACT

A program data structure is defined by a data field definition having a plurality of data field definition blocks, the data field definition blocks comprising a plurality of data items, the data items including data item names, data item hierarchy data and data item length data. A user uses a mouse pointer and clicks it on a data item in a program to select the data item. The method of the present invention calculates offset data for selected data items. When there is a data item that is used for re-definition, the offset for a data item to be re-defined is added to the offset data to provide an offset value. The data items are arranged in order according to their hierarchical relationship, and data items that have the same offset are displayed as a single line. A numeral for an offset is added to the line, and a broken line is used to separate lines of data items.

19 Claims, 19 Drawing Sheets

```
                    125  127   129
                     )    )     )
                    DCL 01 TOP_REC, ~ 130
                        02 F1,
                            03 F11   FIXED BIN,
                            03 F12   FIXED BIN,
131                         03 F13   CHAR (6),
                        02 F2    CHAR (10),
                        02 F3 (5),
                            03 F31   BIT (8),
                            03 F32   CHAR (5);
                                              ~137
                    139 ~
                    DCL 01 REDEF_REC DEF TOP_REC,
                        05 R1    CHAR (4),
                        05 R2,
133                         10 R21   CHAR (4),
                            10 R22   CHAR (2),
                        05 R3    CHAR(10),
                        05 R4    CHAR (30);

DCL 01 REDEF_F DEF F2,
                        02 RF1   FIXED BIN,
135                     02 RF2   CHAR (3),
                        02 RF3   CHAR (5);
```

*FIG. 3*

```
F: ¥doc¥pat¥pby¥PhyDatSt.pli
File   Edit   View   Selected   Ebookie   Help
SAMPLE: PROCEDURE OPTIONS(MAIN) ;
  DCL  01  TOP_REC,
         02  F1,
              03  F11   FIXED BIN,
              03  F12   FIXED BIN,
              03  F13   CHAR(6),
         02  F2    CHAR(10),
         02  F3 (5),
              03  F31   BIT(8),
              03  F32   CHAR(5);
  DCL  01  REDEF_REC DEF TOP_REC,
         05  R1    CHAR(4),
         05  R2,
              10  R21   CHAR(4),
              10  R22   CHAR(2),
         05  R3    CHAR(10),
         05  R4    CHAR(30);
  DCL  01  REDEF_F DEF F2,
         02  RF1   FIXED BIN,
         02  RF2   CHAR(3),
         02  RF3   CHAR(5);

OPEN FILE (NURYOKU);           ─605
  READ FILE (NURYOKU) INTO ( TOP_REC ) ;
END
```

Physical data structure diagram:   TOP_REC

File(F)   Display(D)   Action(A)   Impact analysis(I)                Help(H)

| 0  |         |        |        |            |     |       |          |      |
|----|---------|--------|--------|------------|-----|-------|----------|------|
| 2  | TOP_REC | F1     | F11    | REDEF_REC  | R1  |       |          |      |
| 4  |         |        | F12    |            |     |       |          |      |
| 8  |         |        | F13    |            | R2  | R21   |          |      |
| 10 |         |        |        |            |     | R22   |          |      |
| 12 |         | F2     |        |            | R3  |       | REDEF_F  | RF1  |
| 15 |         |        |        |            |     |       |          | RF2  |
| 20 |         |        |        |            |     |       |          | RF3  |
| 21 |         | F3(5)  | F31    |            | R4  |       |          |      |
| 26 |         |        | F32    |            |     |       |          |      |
| 50 |         |        |        |            |     |       |          |      |

*FIG. 19*

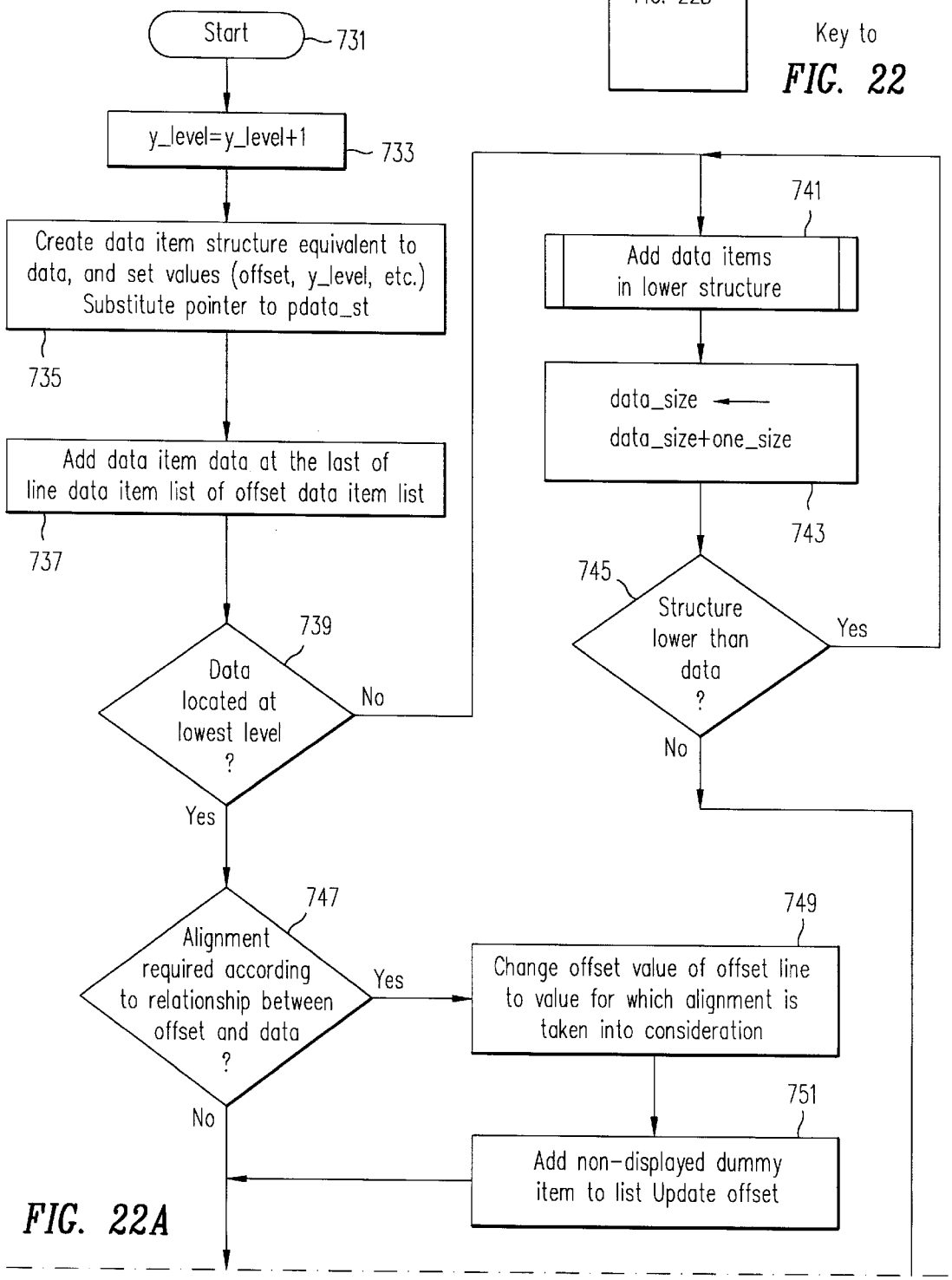

METHOD FOR DISPLAYING A DATA STRUCTURE OF A PROGRAM

RELATED DOCUMENT

Commonly assigned U.S. patent application Ser. No. 08/824,690, field Apr. 8, 1997, now pending, shows a display system for analyzing and displaying a data structure of a program.

TECHNICAL FIELD

The present invention relates to program data structures, and more particularly to a method that displays a data structure of a program which supports the visual and intuitive understanding of data structures in the program.

BACKGROUND OF THE INVENTION

Very frequently during the life cycle of an existing computer program that was written by a third party, a situation will arise where software maintenance of the program must be performed. Taking into consideration the report that software maintenance expenditures may account for 80% of the costs accrued over the life cycle of a program, for maintenance of the existing program, it is important that the program be understood exactly. When the maintenance performed for such a program is based on an incomplete understanding of its data structures, new data may overwrite data fields that were previously prepared, or data may be entered into data fields for which it is not intended and may later be overwritten when other data are written therein. In addition, in a region wherein are recorded money amounts, etc., data may be incorrectly identified (for example, when re-definition is performed for a region, and a value is shifted one digit to the left, 1,000,000 yen will be identified as 10,000,000 yen), which will result in the occurrence of irresoluble system operating obstacles and employment problems.

For the maintenance of a program, careful testing and application of test procedures is required; and the searching for mistakes in the code, and the correcting, the compiling and the re-testing of the code must be repeated until a normal operation is attained. For newly created programs, however, full and complete documentation that defines data fields must be provided. If data field documentation is inaccurate or incomplete, the above problems will occur. A full understanding of program data structures, and documentation that defines data fields are important, therefore, not only for the processes that are used for the maintenance of existing programs, but also for the processes that are used to develop new programs.

A coding method for re-defining data fields that were previously defined has been adapted for use with many program languages, such as PL/I, Cobol, C, Fortran, assembler and Pascal. According to the coding method for re-defining data fields, since a physical area that is a shared use is defined by a plurality of different data items, such as record length and record attributes, the difficulty in acquiring a full understanding of a data structure tends to be compounded. Furthermore, in many cases the areas that are defined by code for the definition of data fields, and those that are defined by code for the re-definition of data fields are positioned at locations that are physically distant from each other; and as the number of data items for defining data fields is increased, and the two sets of code are subsequently positioned at locations that are increasingly distant from each other, it becomes progressively more difficult to obtain an exact understanding of a program's data structures by examining only its code.

There is a demand, therefore, for a system and a method that provide support for obtaining a visual and intuitive understanding of the data structure of a program, and that provide a location in a memory area where a program can be quickly and correctly developed and analyzed.

For conventional problems, M. A. Jackson (J. Martin and C. McClure, "Structure Techniques: The Basis for CASE", PRENTICE HALL, Englewood Cliffs, N.J. 07632, Page 209) proposed a system that employs a Data-Structure Diagram (hereinafter referred to as the "Jackson Diagram"). The Jackson Diagram employs a hierarchial chart to visually express a data structure in a data field that illustrates the hierarchial relationship existing between data items. The Jackson Diagram is used when a program is designed, but is not used to express, using an easy format, the data structure of a program that is being coded. Further, the Jackson Diagram represents only the hierarchial relationship of the data structures, and can neither designate which areas the individual data items occupy nor describe how they overlap.

IBM Technical Disclosure Bulletin, "VISUALIZATION METHOD FOR PROGRAM DATA ITEMS", Vol. 37, No. 04B, April 1994, pp. 95–96, proposes a system whereby code for a re-defined data structure matches the head position of the code for a data structure that has been defined and is displayed at a position alongside the head position. According to this system, although the code for the defined data structure and the code for the re-defined data structure can be recognized simultaneously, the overlapping of the individual data items in the memory area can not be intuitively described. Further, the matching of boundaries by alignment can not be expressed.

In Japanese Unexamined Patent Publication No. Hei 7-230379 a system is proposed for displaying the data structure of a source program by using a record hierarchial chart. The system that displays the data structure using the chart can indicate which portions in the memory area individual data items occupy, and how the data items overlap, but can not clearly describe the correlation between a defined area and a re-defined area. In addition, although in this system a memory size is to be expressed as the lateral length of a box, that size is too large for a general program that a user develops and employs, and it is difficult for the data structures to be intuitively displayed. The display method does not resemble the code, and is a little too abstract to be used by programmers as a reference for the changing of a program. Furthermore, since this system employs graphical expressions, a GUI (Graphical User Interface) is therefore required.

SUMMARY OF THE INVENTION

It is an object of the present invention to provide a method that ensures the visual and intuitive understanding of the data structures of a program and the re-definition thereof.

The program data structure is defined by a data field definition having a plurality of data field definition blocks, the data field definition blocks comprising a plurality of data items, the data items including data item names, data item hierarchy data and data item length data. A user uses a mouse pointer and clicks it on a data item in a program to select the data item. The method of the present invention calculates offset data for selected data items. When there is a data item that is used for re-definition, the offset for a data item to be re-defined is added to the offset data to provide an offset value. The data items are arranged in order according to their hierarchical relationship, and data items that have the same offset are displayed as a single line. A numeral for an offset is added to the line, and a broken line is used to separate lines of data items.

For a fuller understanding of the present invention, reference should be made to the following detailed description taken in conjunction with the accompanying drawings. dr

BRIEF DESCRIPTION OF THE DRAWINGS

FIG. 3 is a diagram illustrating a data structure declaration portion of an input program to be analyzed for display according to the present invention;

FIG. 19 is a diagram illustrating a display example wherein the present invention is carried out, in a multi-window environment, in a dialogue form;

DETAILED DESCRIPTION OF THE INVENTION

Figure 1:
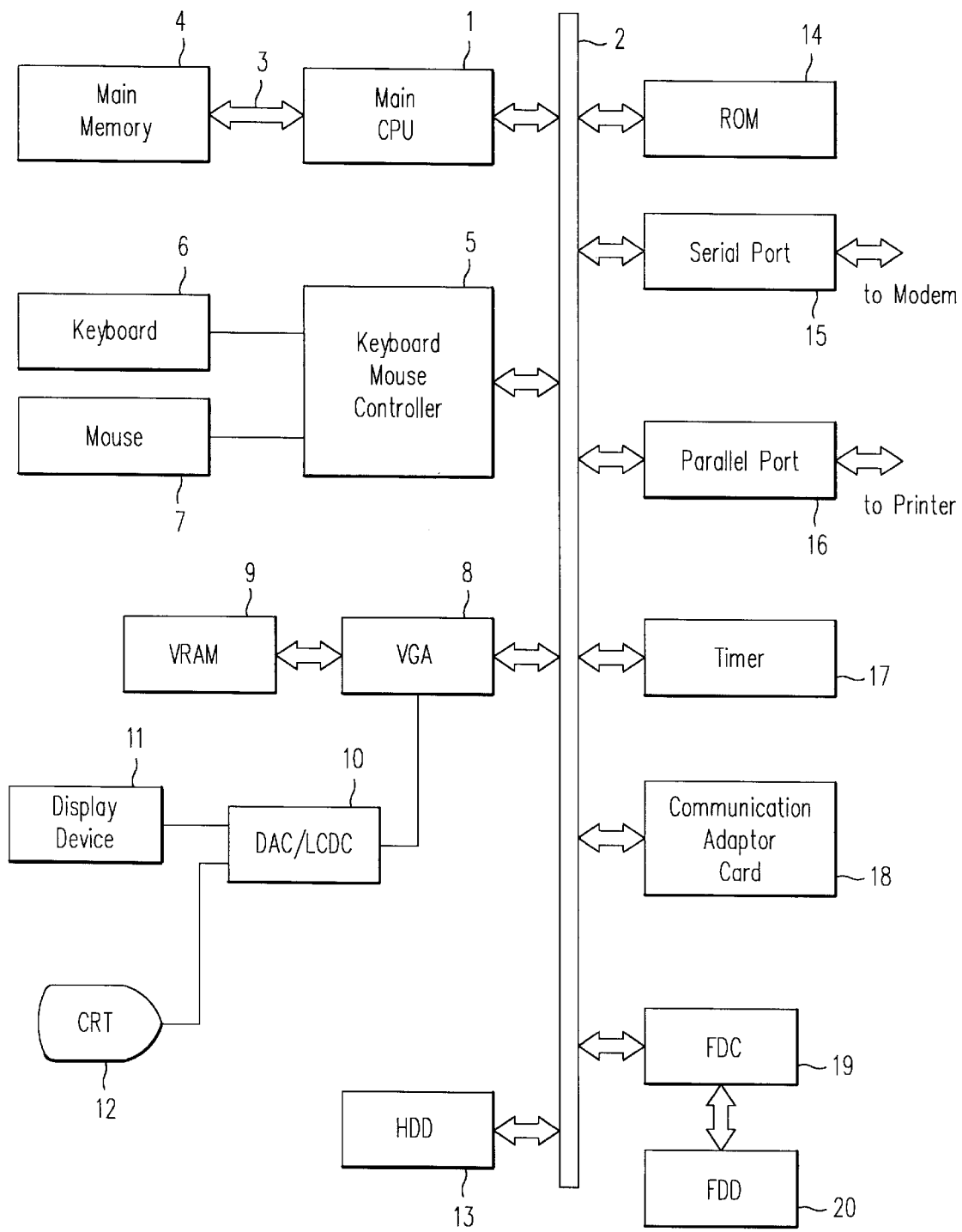
FIG. 1 is a block diagram illustrating an example of a computer system for implementing the present invention.

The preferred embodiment of the invention will now be described while referring to the drawings. FIG. 1 is a schematic diagram illustrating a hardware arrangement according to the present invention. A system 100 comprises, in part, a central processing unit (main CPU) 1 and a memory 4. The CPU 1 and the main memory 4 communicate via a bus 2 with a hard disk drive (HDD) 13, which is an auxiliary storage device. A floppy disk drive (FDD) 20 (or an MO or a CD-ROM drive) is connected to the bus 2 via a floppy disk controller (FDC) 19.

A floppy disk (or a recording medium such as an MO disk or a CD-ROM disk) is inserted into the floppy disk drive 20 (or into an MO or CD-ROM drive). Code for a computer program, which in cooperation with an operating system issues commands to the CPU 1, etc., to carry out the present invention, can be recorded on the floppy disk and on the hard disk drive 13, and in a ROM 14. The code is loaded into the memory 4 for execution. The computer program code may be compressed, or may be divided into a plurality of codes and recorded using a plurality of media.

The system 100 may be a system that includes user interface hardware. User interface hardware components are, for example, a pointing device (a mouse, a joy stick, etc.) 7 or a keyboard 6 for inputting data, and a display (CRT) 12 for providing a visual data display for a user. A printer, via a parallel port 16, and a modem, via a serial port 15, can be connected to the communication terminal 100, so that it can communicate with another computer via the serial port 15 and the modem, or via a communication adaptor 18.

It would therefore be easily understood that the present invention can be provided by employing a conventional personal computer (PC) or a workstation, or a combination of the two. The above described components, however, are merely examples, and not all of them are required for the present invention. Although a system in a stand-alone environment is shown in FIG. 1, the present invention can be applied as a client/server system, for example. The system 100 of the present invention may be located in a server machine, while a client machine may be connected to the server machine by a LAN via Ethernet or a token ring, and an input device for inputting a program and a display device for observing the result may be located in the client machine.

A desired operating system for the present invention is, for example, Windows (a trademark of Microsoft Corp.), OS/2 (a trademark of IBM Corp.), or the X-Window system (a trademark of MIT) on AIX (a trademark of IBM Corp.), all of which provide support for a GUI multi-window environment. The present invention, however, can be realized within a character based environment provided by PC-DOS (a trademark of IBM Corp.) or MS-DOS (a trademark of Microsoft Corp.), and is not limited to a specific operating system environment.

An example program that is input in the present invention, and an example data structure provided by the embodiment will now be described. In FIG. 3 is shown an example data declaration portion of the input program, which defines a data field that is used in this program (data field definition portion). Coding here is performed in PL/I, as an example. Although in this embodiment, the data declaration portion is an integral part of a source program, one part, or all, of the data declaration portion may be stored in a different area, separate from the source program, and may be linked with the source program at the time of compiling.

The data structure, coded as is shown in FIG. 3, is divided into units of one DCL (DECLARE Statements) 125 each, and each DECLARE statements 125 is regarded as a block. Blocks 131, 133 and 135 are called data field definition blocks for defining fields that include a shared data field. The data field definition block 131 defines data item 130 of data item name 129, "TOP_REC". The data item 130, as defined by data item hierarchical data 127 (data numbering of "01" or "02"), has a hierarchical structure in which the data items "F1", "F2" and "F3" are immediately subordinate structures. "F1" consists of the three data items 130, "F11", "F12" and "F13", and ten bytes are assigned to "F1". "F3(5)" is used to designate an array consisting of five elements. One of the "F3" elements holds six bytes: one byte is held by "F31" and five bytes are held by "F32", giving "F3(5)" a total of 30 bytes, since it represents an array of five elements. In this specification, data for determining the data length of a data item is called data item length data 137, and includes, as a general idea, not only data for a byte count, such as the "10" in "CHAR(10)" as defined by "F2", but also array data, such as "F3(5)", and attribute data for a data item, such as "FIXED BIN".

While the record "TOP_REC" occupies positions from the 0th byte up to the 50th byte, another record, "REDEF_REC", occupies the same position range. This is called the re-definition or the re-naming of data. A data item for re-definition, such as "REDEF REC", is called a re-definition data item, and a data item to be re-defined, such as "TOP_REC", is called a data item to be re-defined. The relationship relative to the re-definition process is identified by a system that uses "DEF", which is data item re-definition information 139. As to the re-definition of data, not only can it be performed for a single complete record, but it can also be performed for a subordinate element of a large structure. As where the record "REDEF_F" re-defines only the "F2" element of "TOP_REC". A precise description of the re-definition to be performed, identifies the record range within which data will be corrected. In this example, that data correction concerning "RF1" of "REDEF_F" affects "R3" in "REDEF_REC" and "F2" in "TOP_REC" is clearly described.

Figure 4:
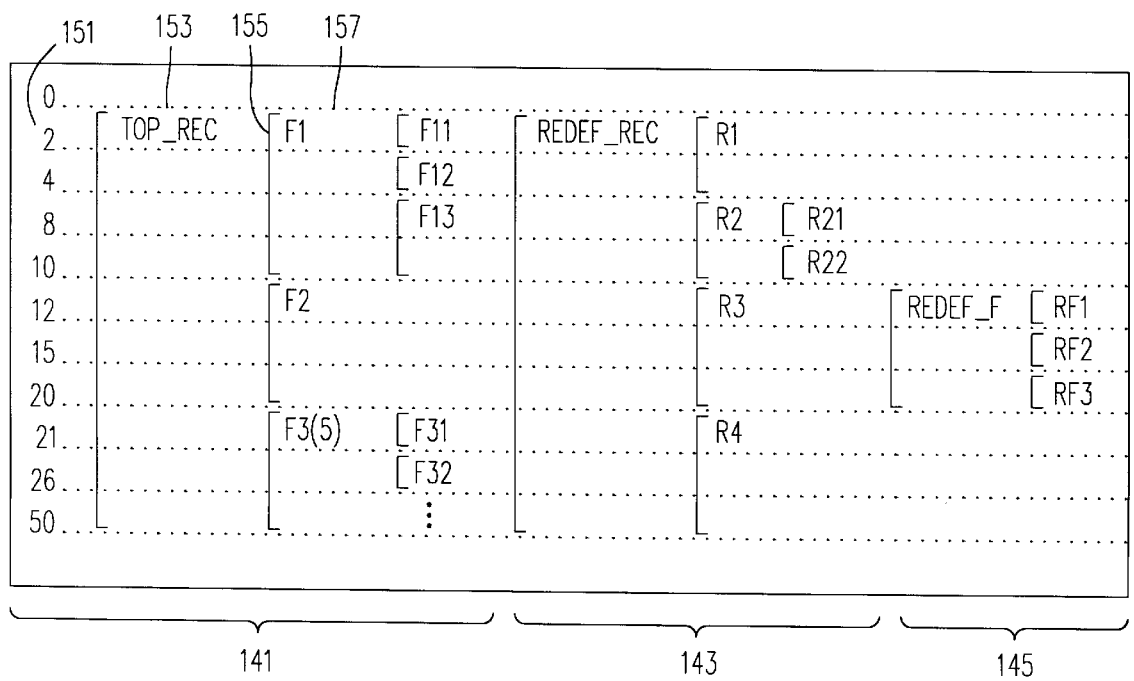
FIG. 4 is a diagram illustrating a layout for a data structure that is displayed according to an embodiment of the present invention.

In the preferred embodiment of the present invention, the data field definition portion shown in FIG. 3 is expressed as is shown in FIG. 4, and is output. Values 151 in the left column represent the number of bytes involved. These values correspond to the head positions (offsets) of individual data items. Since the intervals between the broken lines drawn horizontally do not represent equal byte intervals, a broken line 153 is drawn at the border between the ranges occupied by the data items. Although the intervals between the broken lines can span an equal number of bytes, and the length of the vertical line of a bracket "[" 155 can be used to describe the size of data, generally, the sizes of individual data sets are large and the data can not be displayed on a display device. In this embodiment of the present invention, therefore, the border between data ranges is clearly shown by a broken line and the number of bytes (offsets) is entered adjacent to the border. The offset can be expressed as the number of bytes or the number of bits, as is shown in FIG. 3. The data field definition blocks 131, 133 and 135 that are input are arranged laterally according to their re-definition relationship (141, 143 and 145). Since the data structure of the present invention is displayed as is shown in FIG. 4, for each data item, a range that the data occupies in the memory area, the data hierarchical order, re-definition of data, the shared use of data between the records, and a data array and its size can be clearly represented.

The system architecture of the present invention will now be explained while referring to FIG. 2. A program 101 that is input in the preferred embodiment of the present invention is a source program stored on a recording medium, such as a hard disk, a magnetic tape (MT) or a floppy disk, but it may be a source program that is input from an external system via a communication line. Since an object module can be converted into a source program by a well known method, a program input is not limited to the input of a source program and an object module may also be input. Further, instead of an entire source program or an object module, only an extracted portion of a program that defines a data structure may be input. The portion that defines the data structure may be all, or a part, of a data structure definition statement, which is called an include file (various names, such as a COPY book, are used in COBOL) that is linked with a source program at the time of compiling or of execution.

In the preferred embodiment of the present invention, an input device 111 is, preferably, a pointing device, such as a keyboard 6 or a mouse 7, with which a program to be input is designated and a data item with which to display a data structure is designated. An input controller 113, which preferably is provided in a multi-window environment, can detect an instance when a program or a data definition portion in a program is pointed to by an input device 111, and can transmit the data to a data structure analyzer 103. In addition, the input controller 113 can detect the entry of control data concerning a display, e.g., an entry for restricting display positions, an entry for instructing scrolling, or an entry for convolution, which will be described later, and can transmit the data to a display controller 123.

The data structure analyzer 103 analyzes the data structure of the data items that are included in the input program 101 by using variable declarations in the program 101. In the preferred embodiment of the present invention, the data structure analyzer 103 extracts all the data field definition blocks that are included in the program 101, and extracts and holds data (data structure data 105) concerning the hierarchical relationship of the individual data items included in the data field definition blocks.

Figure 5:
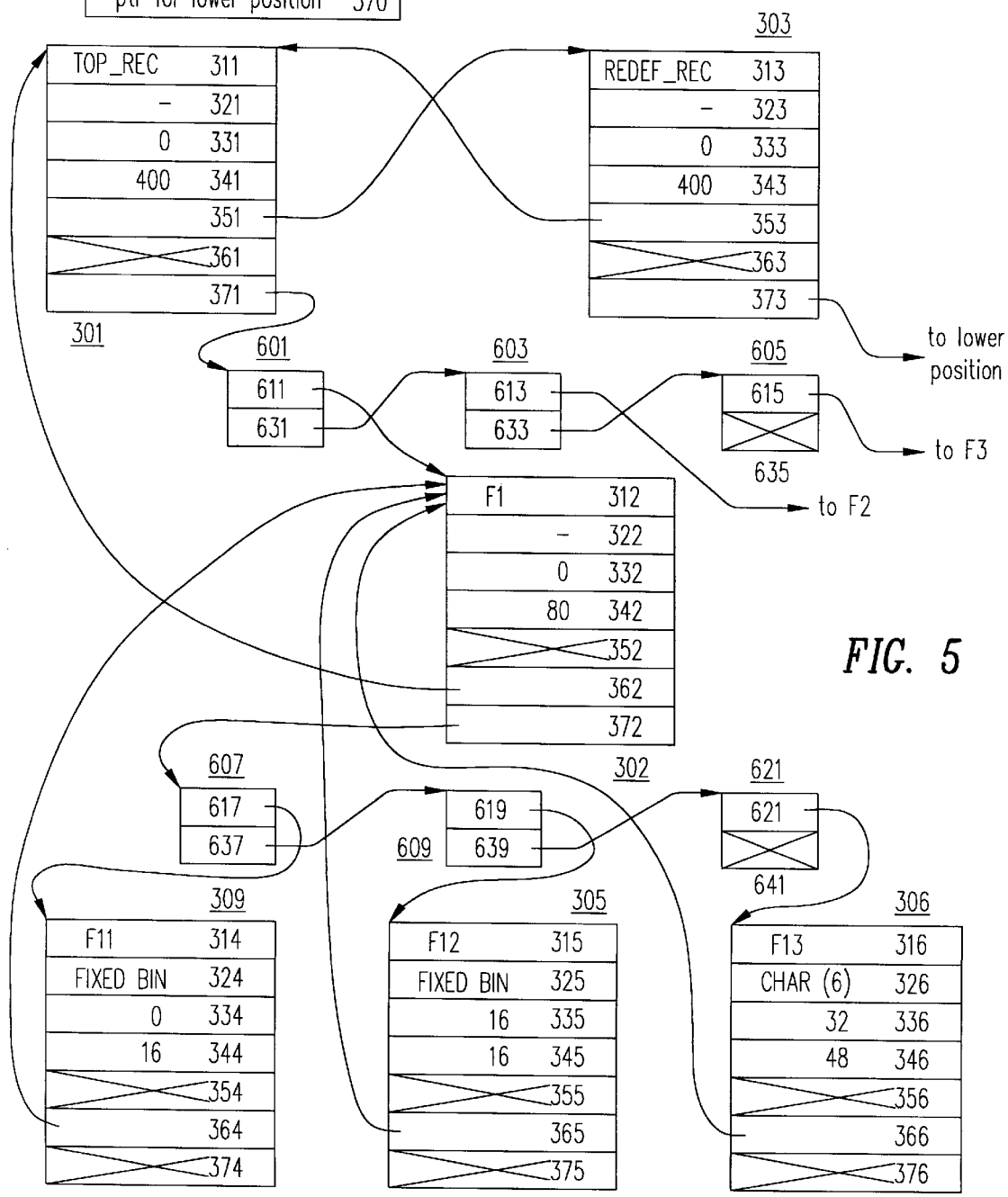
FIG. 5 is a conceptual diagram for data structure data according to an embodiment of the present invention.

FIG. 5 is a conceptual diagram showing the data structure data 105 according to the preferred embodiment of the present invention. For each data item 130, a data item entry 300 is prepared to manage a data item name 310; attribute data 320, such as data item type; offset data 330; data item size data (data item length data) 340; re-definition data 350; and a pointer 360 to an upper position and a pointer 370 to a lower position. A variable name for a data item, such as "REDEF_REC" can be used as the data item name 310, or a name that is converted to correspond to each input data item, such as "G002-001/RG001-001" may be used. If the individual entries specify data items in an input program, the data item name 310 may be expressed by using numbers and symbols.

Data for determining whether a data item is a character item or a numerical item is managed as such attribute data 320 as data item type. In FIG. 5, although "FIXED BIN", "CHAR(6)", etc., is managed as attribute data 320, a symbolic attribute, e.g., "C" for a character item and "N" for a numerical item, can be so managed. The offset data 330 indicates a start position in a data field in which the data item is positioned. The method for calculating the offset for each data item will be described later. The data item size data 340 represents a data length, in a data field, that is occupied by a data item. The data item length data (size data) 340 includes not only "(6)" in "CHAR(6)" but also all the data that are used to determine a data item length, such as "FIXED BIN" or "BIT". Although the offset 330 and the data item length data (size data) 340 are represented by bit units in FIG. 5, they can be managed by using another unit, such as a byte unit. The re-definition data 350 manages data for pointing to a data item that is used for re-definition, or a data item that is to be re-defined by using the data item. Although in the preferred embodiment of the present invention, data indicating the relationship for re-definition are managed in the entries 300 for the data items, the data can be managed separately from the data structure data 105.

The pointer 360 to an upper position points to a position occupied by a data item that is above a position occupied by another data item. The pointer 370 to the lower position points to a position occupied by data item that is under a position pointed to by the pointer 360. In each entry, an "X" indicates that no data item position is pointed to. Since there are a plurality of data item positions to be pointed to by the pointer 370, the pointer 370 points to a list structure 600 that corresponds to the first data item that appears through the use of the list structure 600 to point to lower data items. Included in the list structure 600 are a pointer 610 that points to the data item that corresponds to the list structure, and a pointer 630 that points to the list structure 600 that corresponds to the next data item. The list structure 600 is not necessary in order for the pointer 370 to point to the lower data item, and a plurality of data that specify a data item to be pointed to can be managed in an entry for the pointer 370. Since a data structure can be defined by only one of either the pointer 360 or the pointer 370, only one of the pointers need be present in each of the data item entries 300.

The attribute data 320 and the data item size data 340 are not necessarily required for the entry 300 of each data item because the data item entry 300 includes data for the data item name 310 by which a data item of the input program 101 is specified, and the attribute data of the data item can be specified by the input program 101. When the data are transmitted directly to the display controller 123 or to a layout data generator 107 shown in FIG. 2, a data structure shown in FIG. 4 can be displayed.

Figure 6:
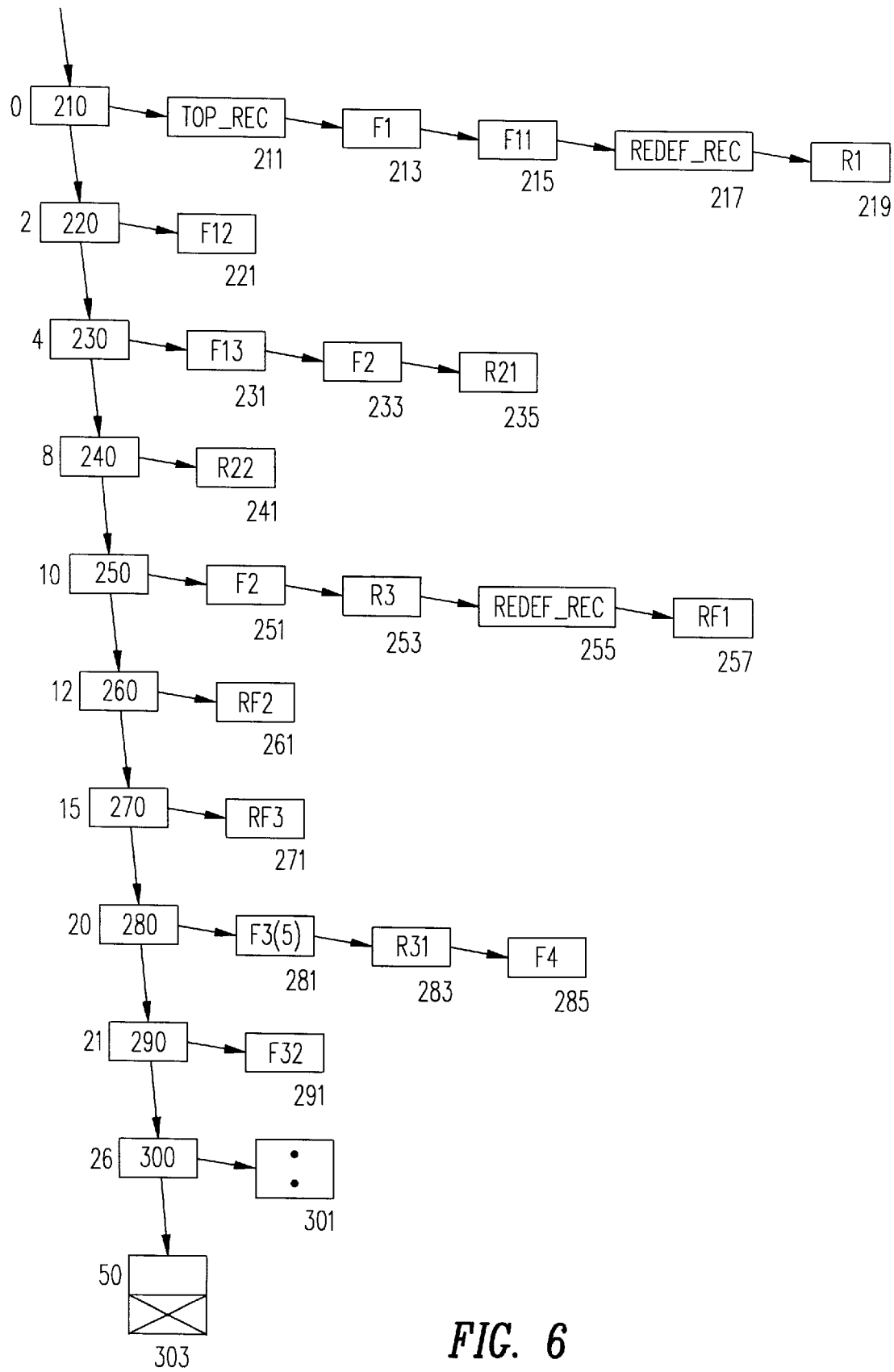
FIG. 6 is a conceptual diagram for layout data according to an embodiment of the present invention.

In this embodiment, the data structure data 105 are transmitted to the layout data generator 107, which processes the received data and relays it to layout data 109. This processing will be described in detail later. The layout data 109 is correlated with the offset that is a shared use, as is shown in the conceptual diagram in FIG. 6. The set of data items that have the shared offset is called the line data. In the line data, the data items are arranged in the data field definition block and the data hierarchical order. A data item name, attribute data, such as a data item type and data item size data (data item length data), are managed in data item entries 211, 213, . . . As well as the data structure data 105, the attribute data and the data item size data are not required for each data item entry. Since the data item entry has a data item name by which a data item in the input program 101 is specified, the attribute data and the data item size data can be specified from the input program 101 or the data structure data 105. Thus, when the attribute data and the data item size data are transmitted directly to the display controller 123 in FIG. 2, the data structure shown in FIG. 4 can be displayed.

The display controller 123 displays data on the display device 121 in accordance with the arrangement of the layout data 109. For display changes, such as scrolling or convoluting with a designated level when the graphic size is increased, vertical and horizontal scrolling data or data for a level to be displayed are input by the input device 111 and are processed by the display controller 123, and the result is displayed on the display device 121.

Figure 2:
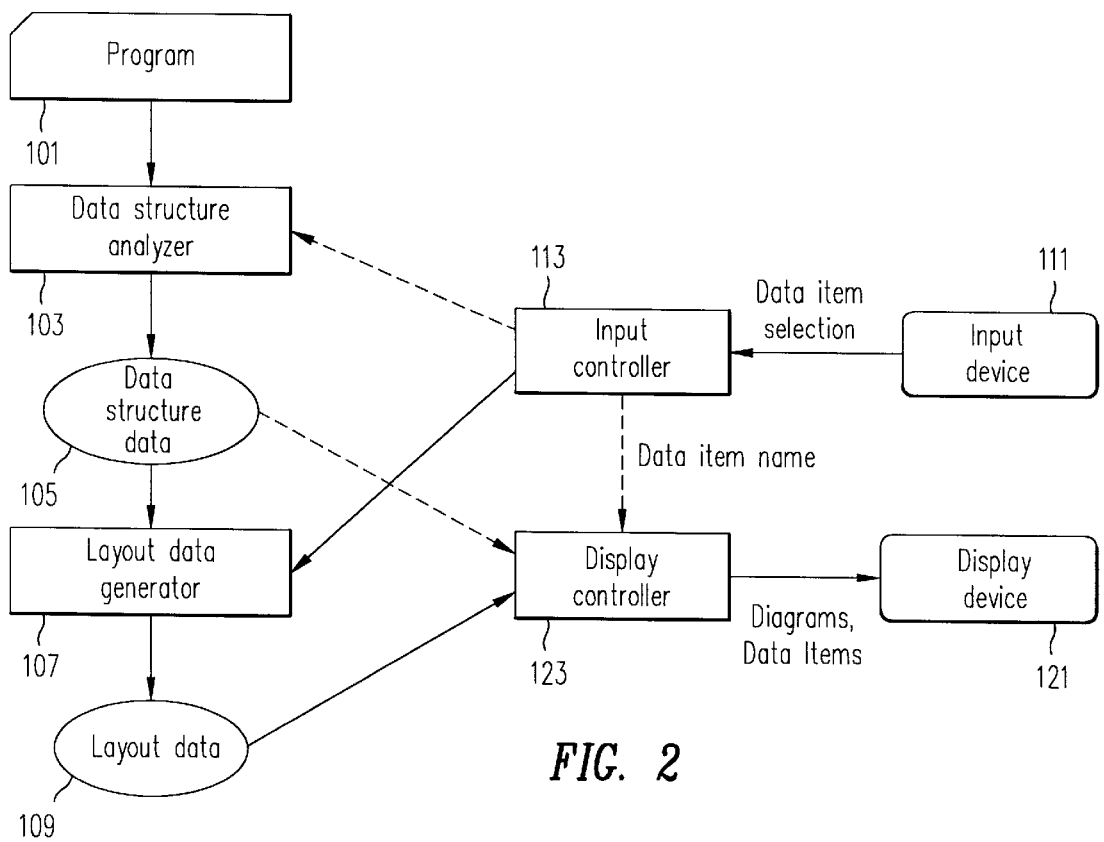
FIG. 2 is a functional block diagram illustrating one example of a system structure according to the present invention.

Although the input device 111, the input controller 113, the display controller 123 and the display device 121 are shown in FIG. 2, in this embodiment, because the method of the present invention is performed interactively, these components are not necessarily required. For example, when the present invention is carried out by a batch job executed upon the receipt of an automatic submit, a program to be input or a data structure portion can be specified by using a JCL (Job Control Language). Layout data to be output can be output to a remote printer, or can be stored in any type of storage medium for display on a screen or for output to the printer.

The operations performed by the display in FIG. 4 are shown in FIGS. 7 through 10. In an actual program, generally, the size of a data structure is large, and even when the data are displayed on a display device, such as in a CRT, frequently they can not be displayed on one screen. In such a case, vertical and horizontal scrolling can be performed, but only one part of the data can be seen on one screen during the scrolling, and it is difficult to visualize the entire data structure. Thus, one method is proposed whereby a display of one part of the data structure is omitted (convoluted) while the data hierarchy relation and the re-definition structure remain on the screen. There are two types of convolution:
1. convolution performed by designating a display level, and
2. convolution performed with a structure that is lower than selected data.

Figure 7:
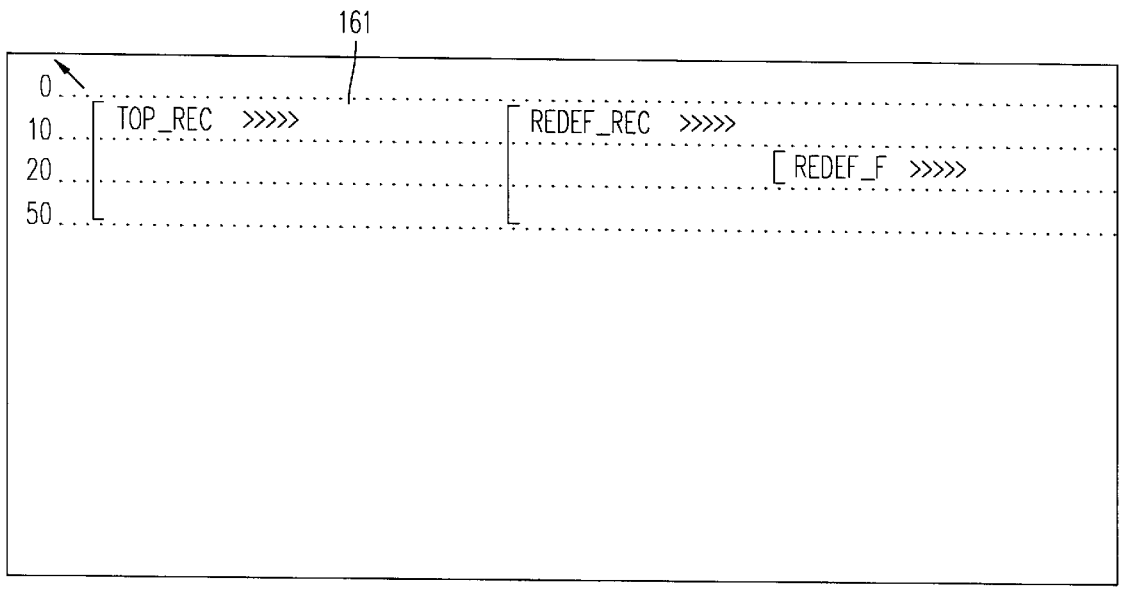
FIG. 7 is a diagram illustrating a layout for a data structure that is displayed according to an embodiment of the present invention.

According to a display provided by performing convolution with a designated display level, the levels from the highest level are designated and the structure below the designated level is convoluted. In FIG. 7 is shown a display of the structure only at the highest level, i.e, at display level 1. The lower structure omitted to be displayed (convoluted) is indicated by ">>>>>". At this level, only the relationship for re-definition is displayed. In the preferred embodiment of the present invention, ">>>>>" is used as the symbol that indicates convolution. However, so long as a user can intuitively identify that convolution has been performed, various other symbols and characters can be used.

Figure 8:
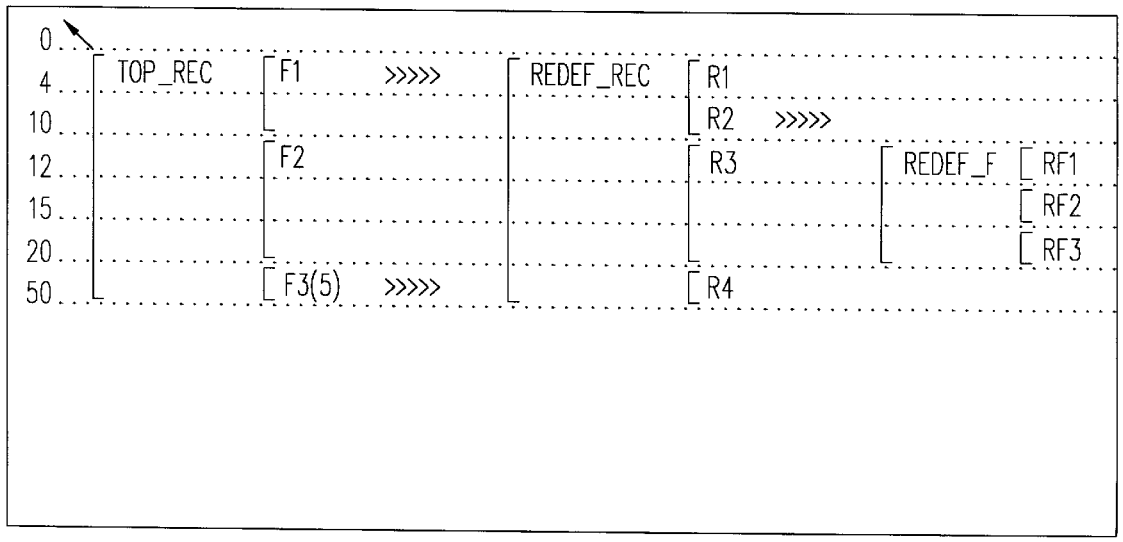
FIG. 8 is a diagram illustrating a layout for a data structure that is displayed according to an embodiment of the present invention.

As is apparent from FIG. 7, the size of the diagrams is reduced both vertically and horizontally, compared with that in FIG. 4. As a result, even diagrams that are too large to be displayed on one screen of the display device can be displayed and identified at a glance. In FIG. 8 is shown the data structure displayed at two levels from the top, while 2 is provided as a level. It is apparent that each re-defined data structure is displayed at the upper two levels. The structure ("F11", "F12", and "F13") that are subordinate to "F1" are convoluted and are represented by ">>>>>". When only the structure for "TOP_REC" is examined, it seems that the length of "[", which corresponds to the structure for "F1", can be maintained so it is the equivalent of one line. However, when the structure of "REDEF_REC", which re-defines "TOP_REC", is examined, "R1" and "R2" exist as the second level in the memory area that is equivalent to the "F1" of "TOP_REC". Therefore, the "[" that is equivalent to the range for "F1" spans two lines vertically. In this manner, when re-definition is required, convolution should not be determined only by one record, but should be performed by referring to the convoluted condition of all the re-defined records.

When the diagrams in FIG. 4 and FIG. 8 are compared with each other for a memory area (between byte 0 and byte 10) that corresponds to "F1", it is found that by convolution a broken line that is laterally drawn to indicate the second byte and the eighth byte is not required in FIG. 8. As a result of the omission of a display of the third and the lower levels, four broken lines in total are eliminated, up to the 50th byte. Therefore, a savings in the space required for displaying graphics can be realized. In this manner, graphics can be displayed that are too large to be displayed on one screen.

Figure 9:
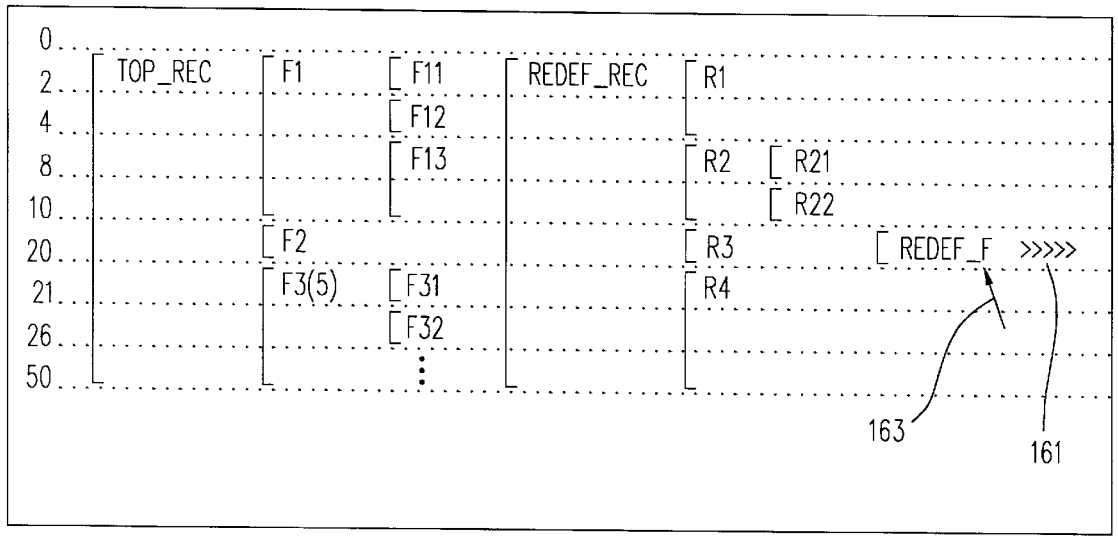
FIG. 9 is a diagram illustrating a layout for a data structure that is displayed according to an embodiment of the present invention.

According to the method for convoluting the structure lower than the selected data, a data item is selected in a graphical display on a display device and the display of the lower structure is omitted. In FIG. 9 is shown the result obtained by selecting "REDEF_F" in FIG. 4 and by convoluting the lower structure. Only the structures of "RF1", "RF2" and "RF3" under "REDEF_F" are convoluted. According to this convolution method, the re-defined data structure must also be taken into consideration. Since, in FIG. 9, "F2" in "TOP_REC" that occupies the same memory area as the record for "REDEF_F", and "R3" in REDEF_REC" are data items that do not have any lower structures, convolution is also easily performed.

Figure 10:
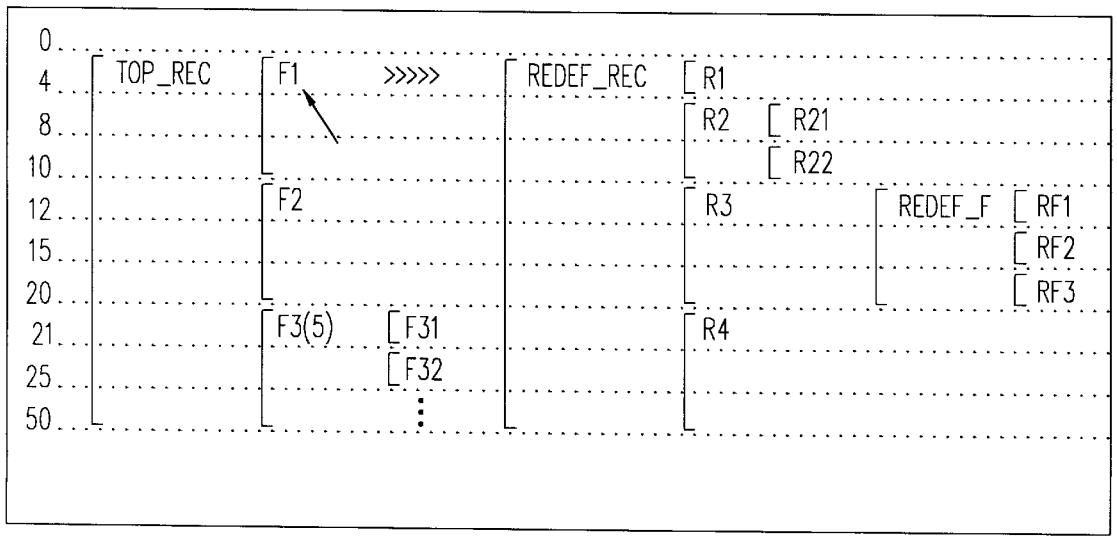
FIG. 10 is a diagram illustrating a layout for a data structure that is displayed according to an embodiment of the present invention.

In FIG. 10 is shown an example wherein "F1" in "TOP_REC" is selected to convolute the lower structure. It is apparent that there are two sets of data "R1" and "R2" in the portion (from the 0th byte to 10th byte in "REDEF_REC") that is equivalent to the same memory area, and that "R21" and "R22" are present as the lower structure for "R2". Since convolution is not designated, the structure of "REDEF_REC" is not convoluted. However, since the structure under "F1" in "TOP_REC" is convoluted, "F11", "F12" and "F13" are convoluted and a broken line that indicates the second byte, and which marks the border between "F11" and "F12", is not required. The second byte in "REDEF_REC" is also not the border between data items, and the broken line at the second byte is erasable. As a result, the lower structure in "REDEF_REC" is not convoluted as well as that in "TOP_REC". "[", which was first expressed by using two lines to describe "R1", is changed to express the height of one line. The omission of a display by employing convolution, while taking re-definition into consideration, is also a unique point of the present invention.

Figure 14:
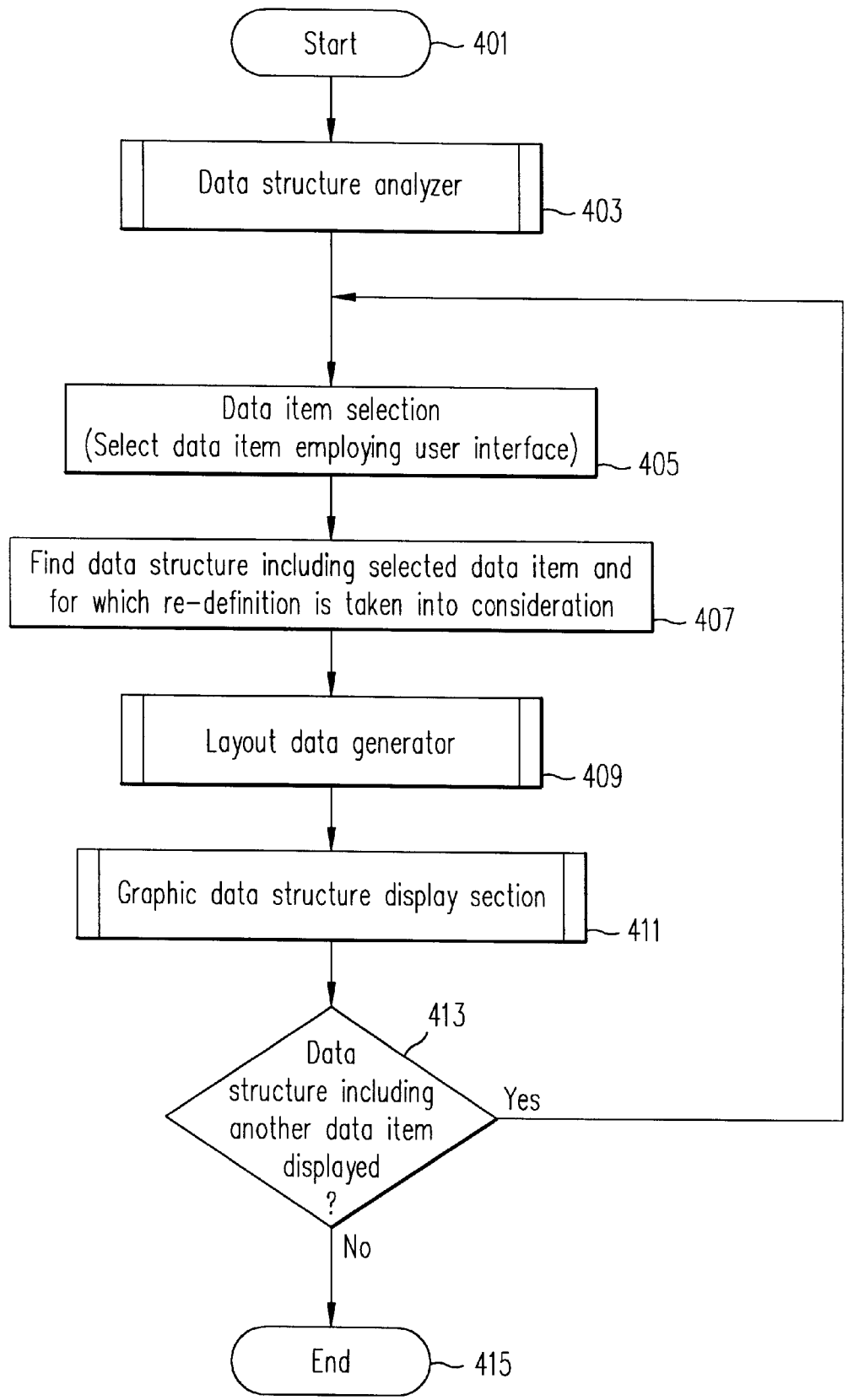
FIG. 14 is a flowchart of the processing for displaying a data structure of an input program according to an embodiment of the present invention; data structure of the input program according to an embodiment of the present invention.

FIG. 14 is a flowchart showing processing according to the preferred embodiment of the present invention for displaying the data structure of an input program. In this processing, first, a data structure is analyzed (step 403). The data structure analyzing processing will be described in detail later. A user employs the pointing device 7 to specify a data item for which the data structure is to be displayed (step 405). The data item may be specified directly by inputting the data item at the keyboard 6. The step for selecting the data item is not always required for the method of the present invention. This is because the data structure data 105 can be prepared by analyzation with the data structure analyzer at step 403 of either the selected data item only, or of all the data structure definition portions that exist in the input program 101.

At step 407, a data structure is found which includes the selected data item and for which re-definition is taken into consideration. The data structure, which includes the selected data item and for which re-definition is taken into consideration, is a shared field definition data block group that includes the selected data item. In FIG. 3, when the selected data item in the data field definition block 135 is RF2, data structures of the data field definition block 135 that includes the data item, the data field definition block 131 that defines a shared data field with the data field definition block 135, and the data field definition block 133 that defines a shared data field with the data field definition block 131 are detected.

The layout data generation process is performed for the data structures that are detected at step 407 (step 409). This generation process will be described in detail later. The data structure graphic display process is performed based on the layout data 109 that are prepared at step 409 and the data structure data 105 that are prepared at step 403 (step 411). This process will also be described in detail later. Then, a check is performed to determine whether or not the data structure that includes another data item is to be displayed (step 413). When the display of another data is requested, the processes at steps 405, 407, 409, 411 and 413 are performed for that data item. In the preferred embodiment of the present invention, at step 413, it is determined whether or not a data item that belongs to another shared field definition block is designated. The data structures of a plurality of shared field definition blocks are not necessarily displayed, and the process at step 413 is therefore not a required process of the present invention.

Figure 15:
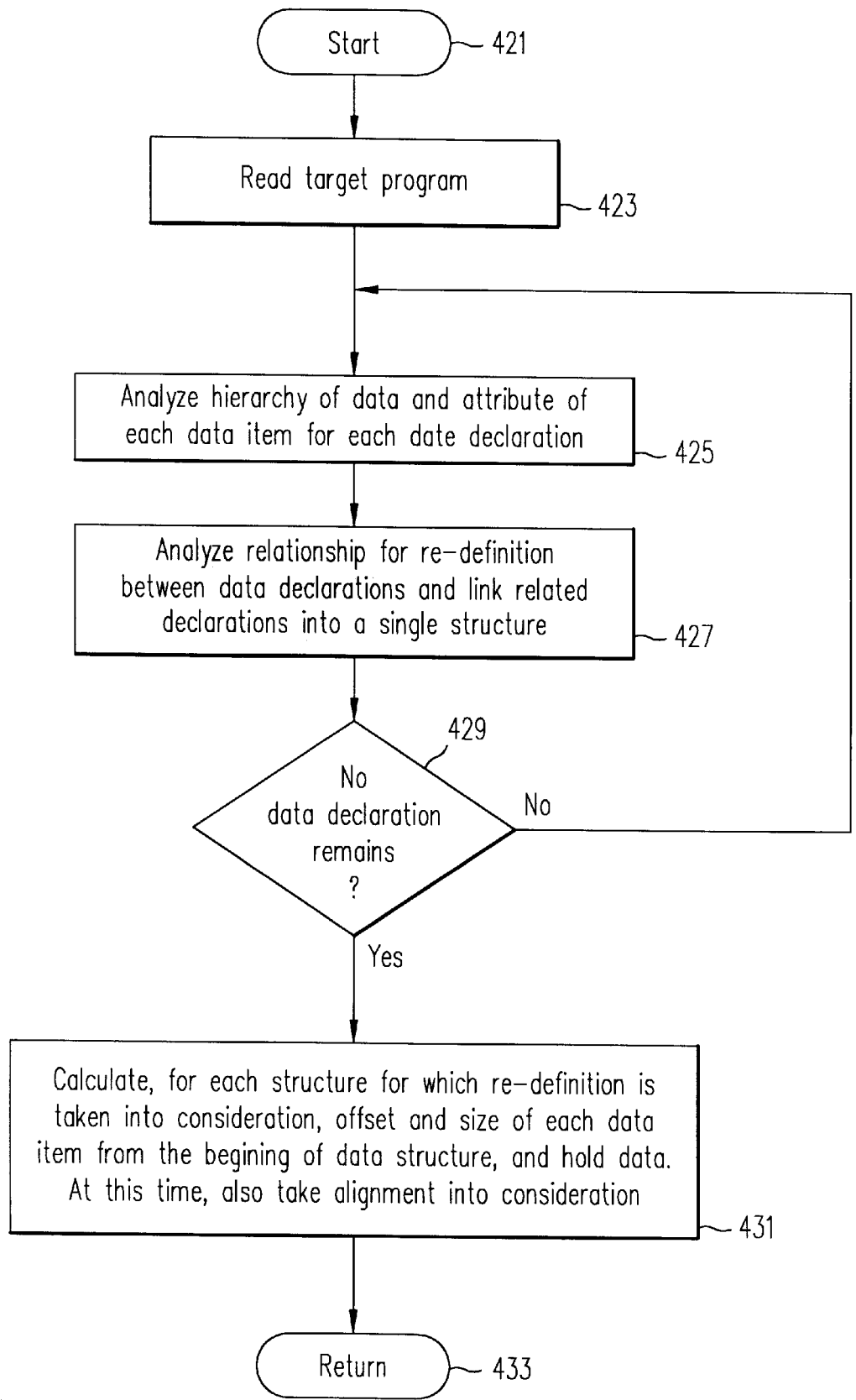
FIG. 15 is a flowchart of the processing for analyzing the data structure of the input program according to an embodiment of the present invention.

FIG. 15 is a flowchart of processing, according to the preferred embodiment of the present invention, for analyzing the data structure of an input program. First, a target program is read (step 423). Then, a hierarchial relationship and the data that each data item manages are analyzed for each data field definition block (step 425). More specifically, the data item name 310, the attribute data 320, such as a data item type, the data item size data (data item length data) 340, the pointer 360 to the upper position, and the pointer 370 to the lower position are output to the entry 300 for each data item shown in FIG. 5. The re-definition relationship between the data items is analyzed, and the data items that are related to each other are connected together (step 427). That is, for each data item shown in FIG. 5, data is input to point to a data item to be coupled with the re-definition data 350 in the entry 300. The processes at step 425 and 427 are performed for all of the data items (step 429).

At step 431, for each data field definition block, the offset for the first data item is calculated, and the item offset for each data item is calculated by using the size of each data item. More specifically, an offset value that is calculated for each data item is held in the offset data 330 of the data item entry 300 shown in FIG. 5. For calculation of the offset value, first, the offset data of the first data item in each data field definition block is set to an offset value of a data item re-defined by using the first data item. When there is no data item to be re-defined, 0 is set as the offset value. The size (data length) of the lower data item is added to the offset value in accordance with the hierarchical arrangement in the data field definition block. It is preferable that an offset value for which alignment is taken into consideration be calculated so that the offset value of a data item of, for example, 22 bits is three bytes (the quotient obtained for division by 8; with a fraction being raised to a unit).

The data field definition block 133 in FIG. 3 is employed for a more specific explanation. First, offset value "0" of TOP_REC is set to REDEF_REC, which is the first data item of the data field definition block 133. Then, the data length of REDEF_REC is added to a current offset value. Since the data length of REDEF_REC is not defined, 0 is added to the current offset value (there is also a method whereby such addition is not performed for a data item for which the data length is not defined). The current offset value (0) is set as the offset value for R1. The data length (4) of R1 is added to the current offset value. The current offset value (4) is set as the offset value for R2, and the data length (0) of R2 is added to the current offset value. Then, the current offset value (4) is set as the offset value for R21, and the data length (4) of R2 is added to the current offset value. Sequentially, the current offset value (8) is set as the offset value of R22, and the data length (2) of the R22 is added to the current offset value. The current offset value (10) is set as the offset value for R3, and the data length (10) of R3 is added to the current offset value. Finally, the current offset value (20) is set as the offset value for R4.

Figure 16:
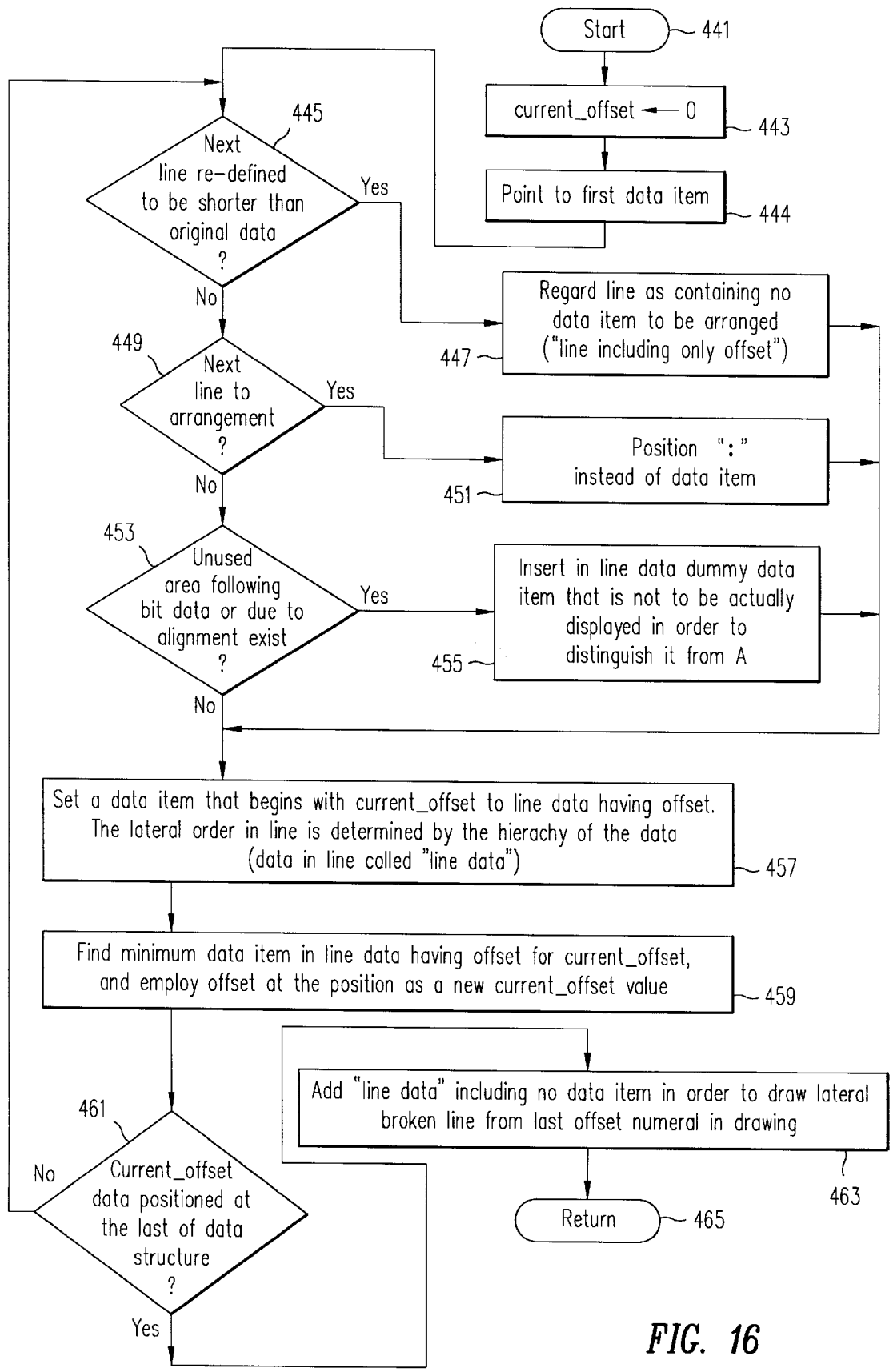
FIG. 16 is a flowchart of the processing for generating layout data according to an embodiment of the present invention.

FIG. 16 is a flowchart of processing according to the preferred embodiment of the present invention for generating layout data. This processing is begun at step 441. First, a data item (TOP_REC) located at the head of the first data field definition block is pointed to (step 444). "0" is set as the current offset value (step 443). Then, a data item that has the current offset value is set to line data that include the current offset value (step 457). Although the decision blocks 445, 449 and 453 are located before step 457, the results of these decisions are NO when the current offset value is "0", and no explanation for these steps will be given here.

The order of the setting at step 457 is determined in accordance with the data hierarchical arrangement. Specifically, a check is performed to determine whether or not a data item (TOP_REC) located at the head of the first data field definition block has the current offset value. When the head data item includes the current offset value, its data item name, etc., is set to line data. Then, F1, which is located at the lower position of the data item (TOP_REC), is pointed to, and a check is performed to determine whether or not this data item has the current offset value. When the data item has the current offset value, its data item name, etc., are set to the line data. Then, F11, which is located at the lower position of this data item (F1), is pointed to. A check is performed to determine whether the selected data item has the current offset value. When the data item has the offset value, its data item name, etc., are set to the line data.

Since there is no data item lower than the data item (F11), the pointer data 630 to the next data item in the list structure 600 is referred to, and the next data item (F12) is pointed to. A check is then performed to determine whether or not the next data item has the current offset value. When the data item has the current offset value, its data item name is set to the line data. Then, a pointer moves to the succeeding data item (F13). A check is performed to determine whether or not this data item has the current offset value. When the data item has the current offset value, its data item name, etc., are set to the line data. Since there is no succeeding data item lower than the data item (F13), a pointer moves to data item (F2) that follows the data item (F1) at the upper position. In the same manner, a data item that has the current offset value is searched for. When the search of the first data field definition block has been completed, a search of the following data field definition block is begun in the same manner.

To search for the succeeding data item, the current offset value is compared with the offset value of the data item. When the offset value of the data item is greater than the current offset value, for efficient searching, a pointer should be moved to the data item in the upper position, instead of being moved to the next data item, because the offset value of the next data item is greater than the offset value of the current data item. Various methods for searching data that have a hierarchial structure are proposed in the field of artificial intelligence, and there are many methods that are well known to one having ordinary skill in the art. To set a data item, the data item may be sorted according to the order of a data field definition block and hierarchical data.

At step 459, the minimum data length selected from among data items, which are set in line data that include the current offset value, is added to the current offset value. When the current offset value is, for example, 4, the data items that are set to the line data are F13, R2 and R21. The data item for the minimum size is R21. Its data length (4) is added to the current offset value (4), and the current offset value is updated to 8.

A check is performed to determine whether the data item of the smallest size is either a data item shorter than the data item to be re-defined (step 445), a data item at the bottom line of an array (step 449), or a data item for which alignment is required (step 453).

Figure 11:
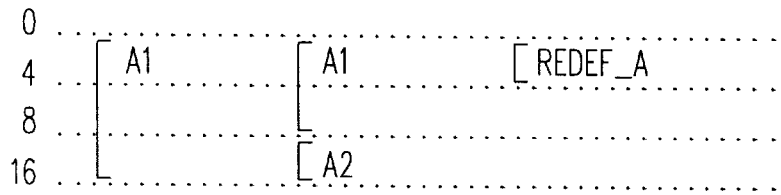
FIG. 11 is a diagram illustrating input and output examples of a data structure to be displayed according to an embodiment of the present invention.

As is shown in FIG. 11, when the length of the data item of the smallest size is shorter than that of the data item to be re-defined, it is ascertained that data items to be arranged are not present in the line, and a line including only an offset is created.

Figure 12:
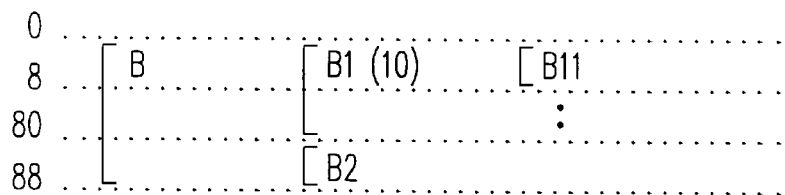
FIG. 12 is a diagram illustrating input and output examples of a data structure to be displayed according to an embodiment of the present invention.

As is shown in FIG. 12, the data item of the smallest size is the data item at the bottom line of the array, ":" is set as the data item (step 451).

Figure 13:
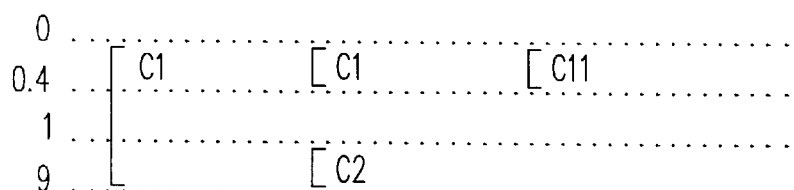
FIG. 13 is a diagram illustrating input and output examples of a data structure to be displayed according to an embodiment of the present invention.

As is shown in FIG. 13, since the data item of the smallest size is a data item that requires alignment, a dummy data item that is not actually displayed is inserted into line data (step 455).

When the current offset is positioned at the last of the data structure (step 461), in other words, when a data item that has the current offset value does not exist, the last offset value in the data structure and line data 303, for drawing a broken line, that has no data item are added. In the preferred embodiment of the present invention, for the final line data 303 there is a flag that indicates the end.

Figure 17:
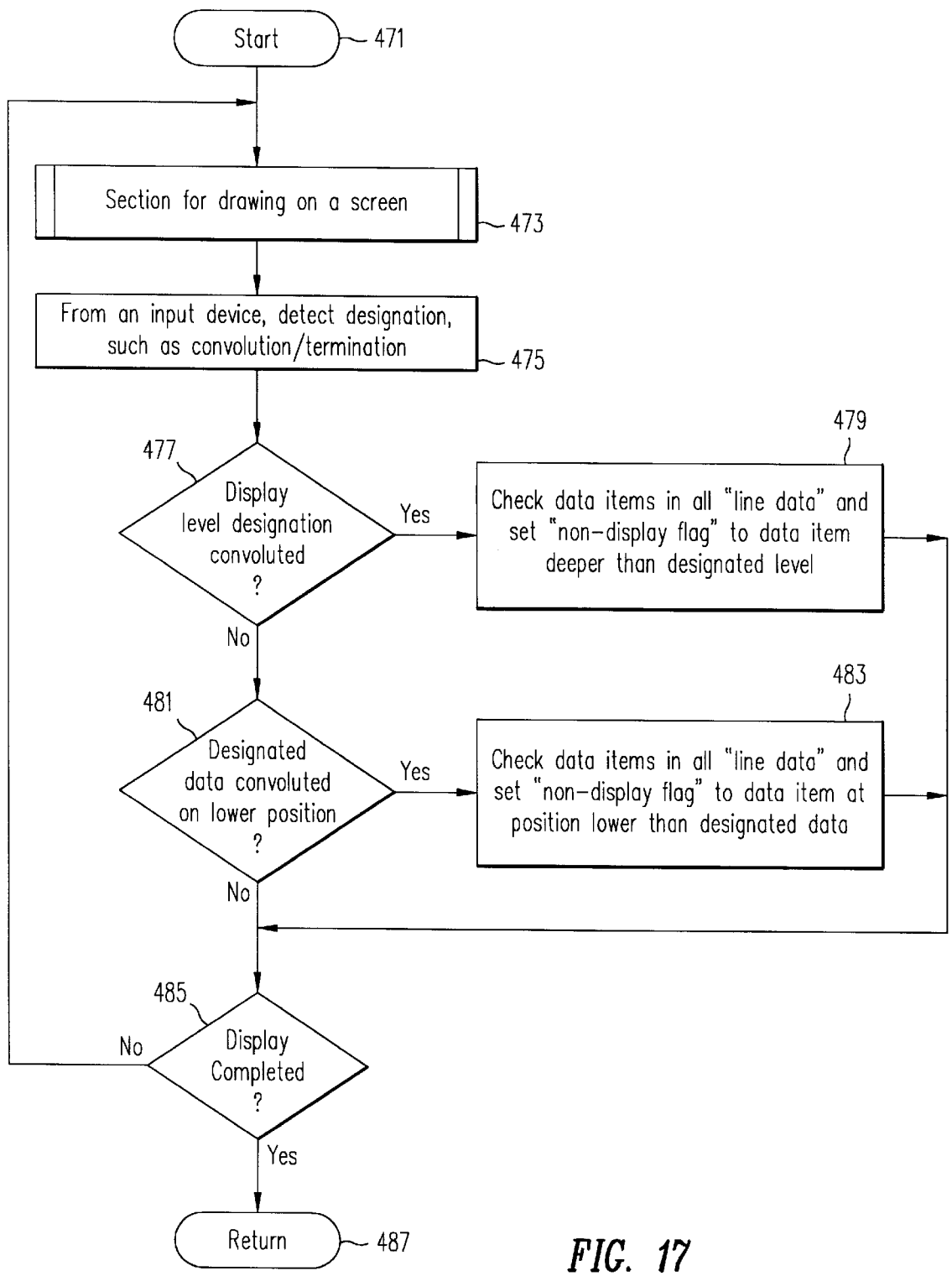
FIG. 17 is a flowchart of the processing for displaying a data structure according to an embodiment of the present invention.
Figure 18A:
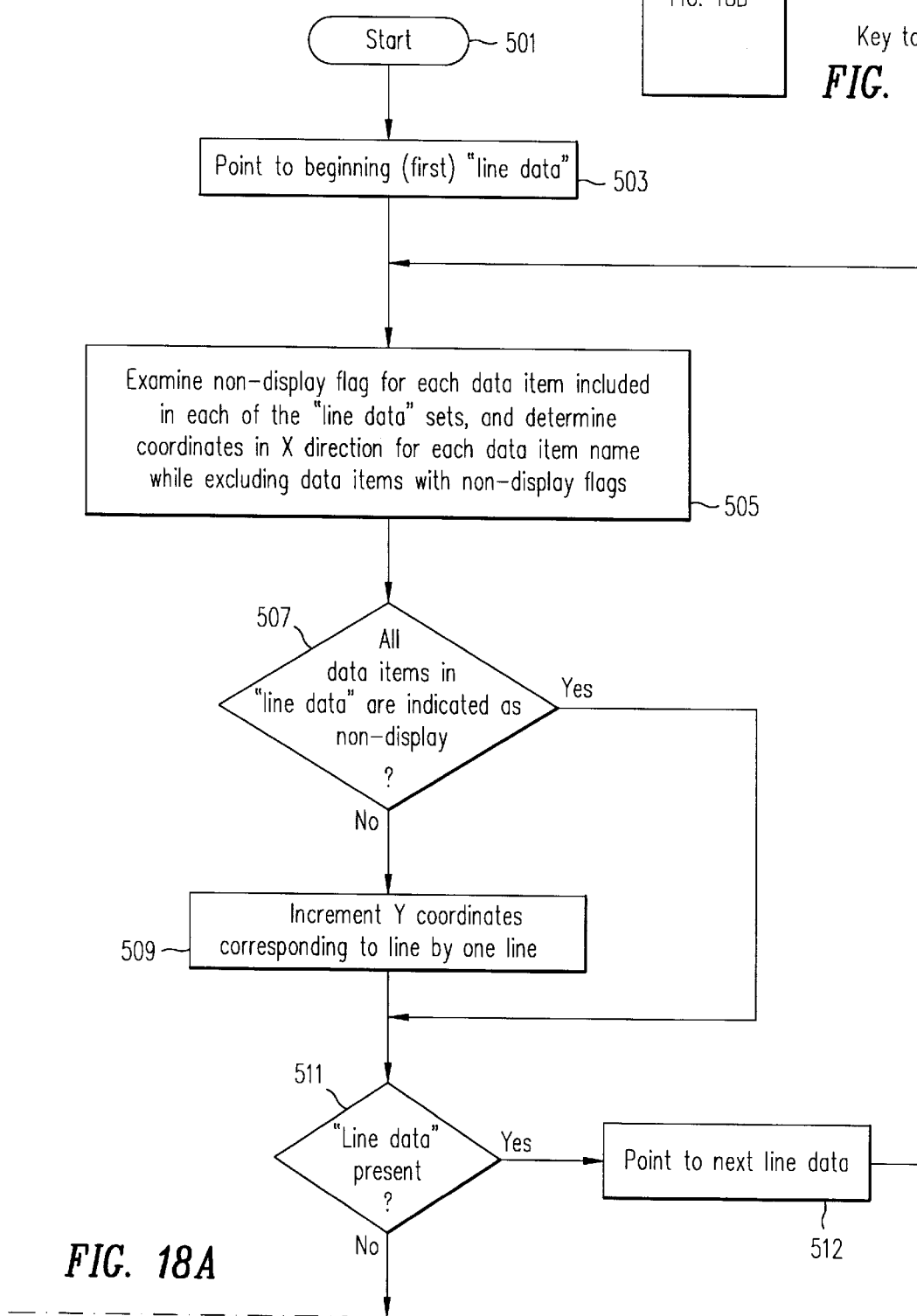
FIG. 18 is a flowchart of the processing for displaying the data structure according to an embodiment of the present invention.
Figure 18B:
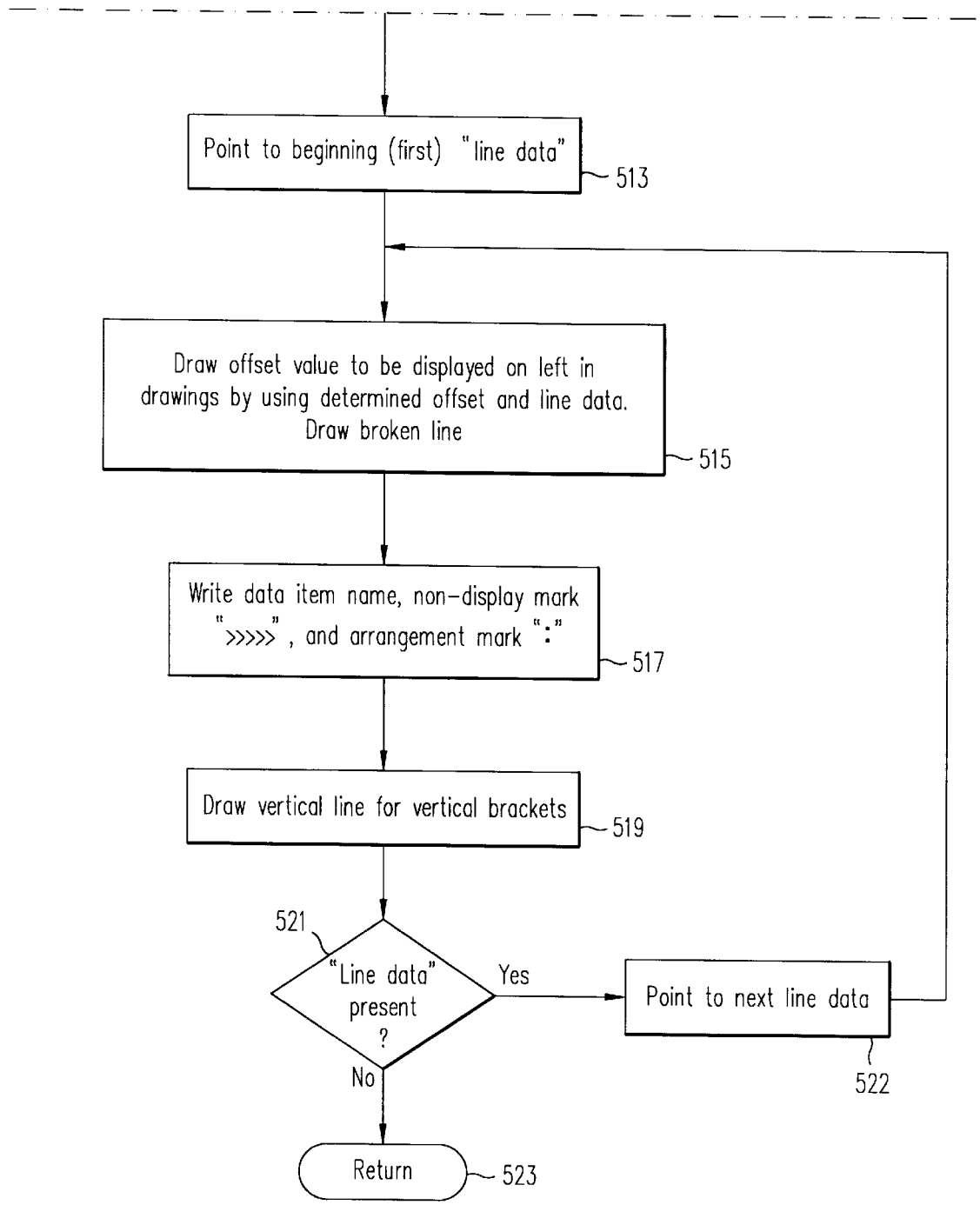

FIG. 17 is a flowchart of the processing according to the preferred embodiment of the present invention for displaying a data structure. The processing is begun at step 471. First, a drawing process on a screen, which will be described later, is performed (step 473). When an instruction for convolution or termination is input by the input device, the input controller detects the entry (step 475). A check is performed to determine whether the entry is for convolution with a designated display level, for convolution of a structure at a lower position than designated data, or for termination of a display (step 477, 481 or 485). When the convolution with a designated display level is entered, the data items in all of line data are examined, and a non-display flag is set to a data item that is located lowermost under the designated data (step 479). When convolution of a lower structure than the designated data is entered, the data items of all line data are examined, and a non-display flag is set to a data item that is at a lower position of the designated data item (step 483). 40 FIG. 18 is a flowchart of the processing according to the preferred embodiment of the present invention for displaying a data structure. The processing is begun at step 501. First, the first line data is pointed to (step 503). Sequentially, for each of the line data sets, a non-display flag is examined for each included data item, and while a data item for which a non-display flag is set is excluded, a coordinate in direction X of each data item is determined (step 505). The coordinate value in direction X at which the data item is to be displayed is correlated with each data item included in the line data. To determine the coordinate value in the direction X, the maximum length for each data item name to be displayed is set, the length and an interval provided between the hierarchial levels are increased, and the results are set to each data item. The interval between the data items can be varied in accordance with the determination of whether or not the data item is the one used for re-definition. Further, the longest item name from among those in each hierarchical level is detected, and the length can be used as an increase for the X coordinate at that hierarchical level. When a data item for which a non-display flag is not set is present in the line data (step 507), the Y coordinate value corresponding to the line is incremented by the equivalent of one line (step 511).

When the above described process has been performed for all the line data (step 511), a pointer is returned to the first line data (step 513). An offset value 151 (see FIG. 4) is drawn by using the offset data for current line data, and a broken line 157 that indicates the same offset is drawn (step 515). Then, a data item name and a symbol for non-display, or a symbol of an array are written (step 517), and the vertical line for a bracket is drawn (step 519). As is shown in FIG. 18, the above described process is performed for all the line data (step 521).

FIG. 19 is a diagram illustrating an example display that is acquired when, in the multi-window environment, the present invention is carried out in a dialogue form. According to the preferred embodiment of the present invention, the present invention is performed in the multi-window environment shown in FIG. 19. A user calls up a program, and the program is displayed in a window 601 of a display screen 600 of a display device. The user clicks a mouse to select a data item using a pointer, and the input controller 113 shown in FIG. 2 detects this operation. As is shown in FIG. 19, a data item (TOP_REC) for reading an input file (NURYOKU) is designated by a read command of the program. For designation of a data item, a data field that is present in a data field definition portion may be selected. Since in many cases the data definition portion is stored in a different file from the program, to avoid the definition of a shared data definition portion from being overlapped by a plurality of programs, it is more preferable that a data item in a program be designated and that a data definition portion that is linked with the data item be accessed.

When the data item has been designated in the above described manner, the user sends a command for the display of the data structure of the data item. There are many methods by which this can be done: a method by which the preparation of a data structure is instructed by using a pull down menu on a title bar; a method according to which a special button icon is clicked on; and a method by which a command is input at a keyboard. The input controller 113 in FIG. 2 detects the command issued by a user, and performs the method of the present invention. When data for the present invention that are to be output are transmitted to the display controller 123, the display controller 123 opens another window 603, and displays the data structure shown in FIG. 19.

In the data structure are shown several functions. A first function is one by which, as was previously described, a desired data item in the data structure is convoluted. When a user designates a data item and instructs convolution, the convolution process that was explained while referring to FIG. 17 is performed.

Figure 20:
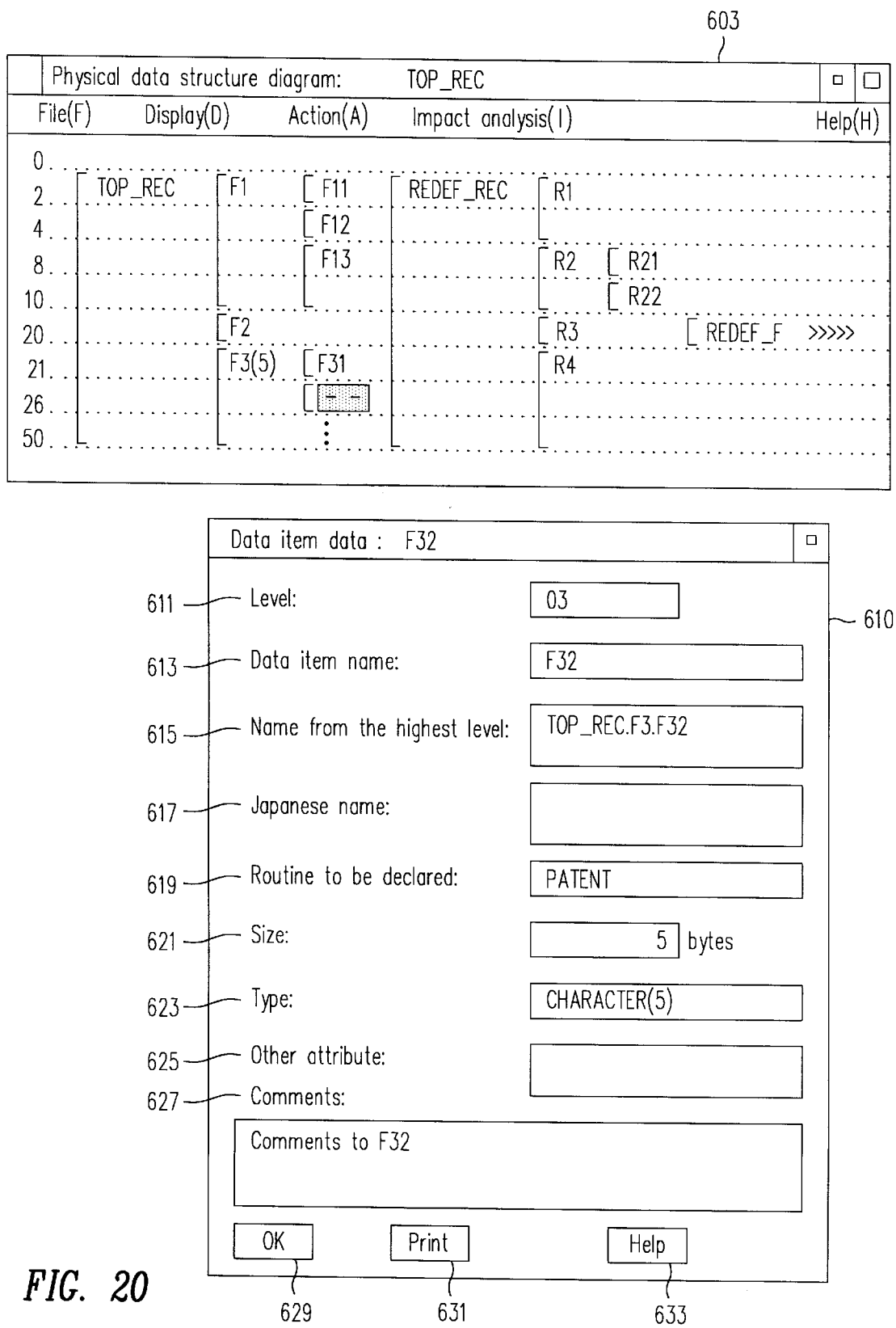
FIG. 20 is a diagram for explaining an additional function according to an embodiment of the present invention.

FIG. 20 is a diagram for explaining an additional function, which is the second function of the embodiment of the present invention. As is shown in FIG. 20, when a user points to a data item in the data structure using a mouse pointer and double clicks on the item, a new window 610 is opened. Various data included in the data item are displayed in the window 610.

The third function is for the updating of a program in accordance with the data displayed in the window 610 in FIG. 20. When, for example, a user corrects data item name F32 to T32 and sends an instruction for updating, the display controller 113 detects this instruction and updates the program 101 in accordance with the changed data. Since the change of a size 621 affects the data structure, a special process is required. When the size data 621 of F12 is changed from two bytes to four bytes (for example, when data for the dominical year are changed from two bytes to four bytes), offset data for the data item that is changed are referred to, and a search is made for line data, which have offset data that are lower than that of the data item. From among the data items that exist in the line data, a data item for which the offset+size is greater than the offset+size of F12 before being updated is specified, and is updated in accordance with a change in the size of F12. In this example, the size of R1 is updated from four bytes to six bytes.

The fourth function is one by which individual data items displayed in the window 603 can be separated with colors in accordance with various attribute data that these data items own. The use of the colors can be performed in accordance with a data item type 623, a level 611, etc.

Although the preferred embodiment of the present invention has been described, the technical idea upon which the present invention is based on is not limited to the embodiment, and can be variously modified during the design stage. In the preferred embodiment of the present invention, for efficient processing, the data structure data 105 are prepared by the data structure analyzer 103, and the layout data 109 are generated by the layout data generator 107. However, the three-step process is not required wherein 1) the program 101 is input and the data structure data 105 are output; 2) The data structure data 105 are input and the layout data 109 are output; and 3) the layout data 109 are input and a data structure is output.

It would be easily understood by one having ordinary skill in the art that the process can be performed by using the following algorithm.

1. Layout data generator main routine

```
void generates_layout_data_from_program ()
{
    data = return_one_data_item_declaration_from_file ();
    while (data != NULL) {
        if (data is beginning of re-definition declaration) {
            layout = return_first_line_head_of_layout_data_concern
                ing_original_data_structure_used_for_re-defini
            tion(data);
            offset = return_offset_of_re-defined_item(data);
            y_level = return_deepest_1ateral_level_at_current
                layout_structure(layout);
        } else {
            layout = prepare_new_empty_layout_data_and_return_first
                line_head(data);
            offset = 0;
            y_level = 0;
        }
        data = add_data_items_in_lower_structure(data, offset,
            y_level, layout, &size);
    }
}
```

2. Adding, to layout data, the data items in a structure that is lower than the designated data, and the returning of a declaration for a next data item to the structure (a sub-tree structure including the data)

```
data_item_declaration for_the_addition_of_data_items_in_the
lower_structure(data, offset, y_level, layout, *size)
{
    y_level = y_level + 1;
    pdata_st = prepare_and_set_data_item_structure_and_return
        pointer(data, offset, y_level, &data_size);
    add_data_item_structure_at_end_of_offset_line_data_item_
list(pdata_st, offset, layout);
    if (data is lowermost data item) {
        if (it is required that offset type be compared with
data type and borders be matched) {
            update_offset_value_in_offset_line(offset, off
set + unused area size, layout);
            prepare_head_of_offset_line_and_insert_it_into_line_
head_list(offset, layout);
            add_to_list_dummy_data_item_structure_that_is_not_
actually_to_be_displayed(offset, y_level, layout);
            offset = offset + unused_area_size;
        }
        if (there is no line head having offset + data_size value) {
            prepare_head_of_offset_line_and_insert_it_into_head_
list(offset + data_size, layout);
        }
    } else {
        data_size = 0;
        next_data = return_one_data_item_declaration_from_
file();
        while (next_data declaration level > data declaration
level) {
            next_data = add_data_item_in_lower_structure(next_data,
        offset, y_level, layout, &one_size);
            data_size = data_size + one_size;
        }
    }
end if
    if (data are arrayed) {
        add_":"_to_list_at_level_obtained_by_adding_one_to_
lateral_level_of_data_item(offset + data_size, y_level,
layout);
        size = data_size * element count in data array;
        if (line head of offset + size does not yet exist) {
            prepare_offset_line_head_and_insert_it_into_line_head_
list(offset, layout);
        }
    } else {
        size = data_size;
    }
    set_final_size_to_data_item_data(pdata_st, size);
    return (next_data);
}
```

Figure 21:
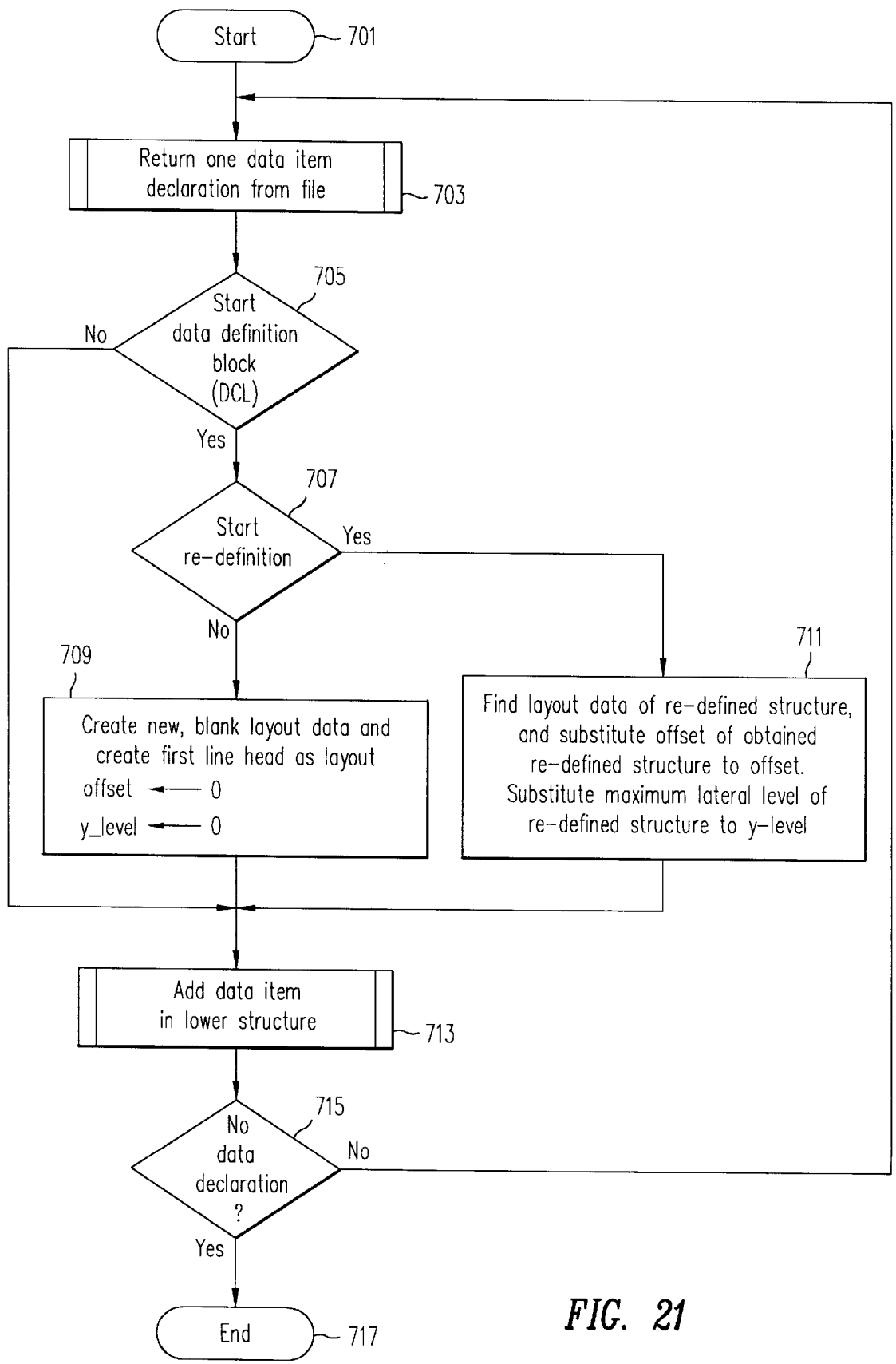
FIG. 21 is a flowchart of the processing for displaying a data structure of an input program according to another embodiment of the present invention.
Figure 22B:
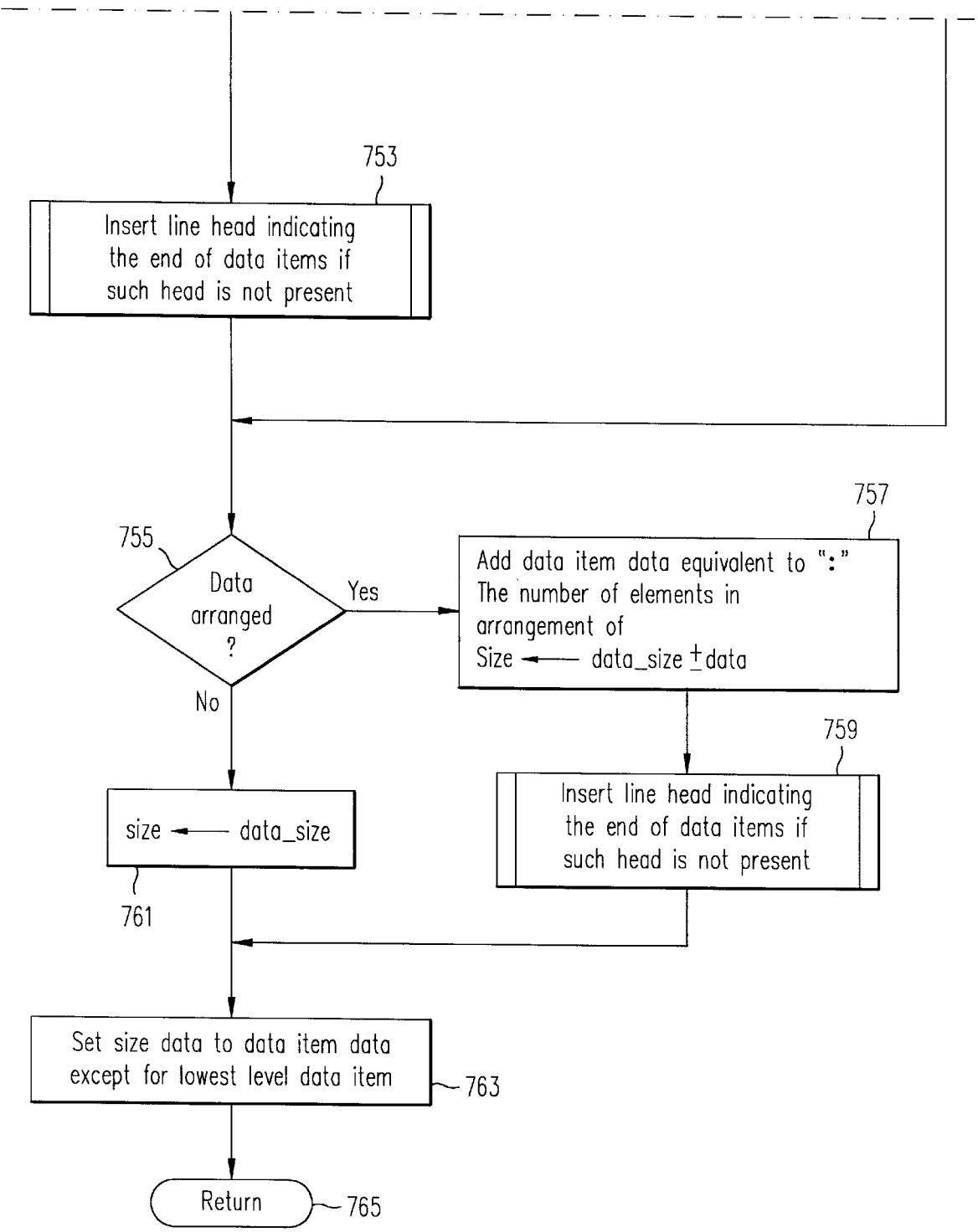
FIG. 22 is a flowchart of the processing for displaying the data structure of the input program according to an embodiment of the present invention.

This algorithm will be explained while referring to the flowcharts in FIGS. 21 and 22. FIGS. 21 and 22 are the flowcharts of the processing performed according to another embodiment of the present invention for displaying a data structure for an input program. In the process shown in FIG. 21, is performed the offsetting of data items (TOP_REC, REDEF_REC and REDEF_F according to the examples in FIGS. 3 and 4), which are located at the heads of the data definition blocks, and the initializing of a level (corresponding to the X coordinate or to hierarchical data). The process in FIG. 21 is begun at step 701. First, one data item declaration is returned from a file (step 703). In this embodiment, the data declaration shown in FIG. 3 is input as units of one line. A check is then performed to determine whether or not the data item declaration line that is input is the beginning of a data definition block (block 705). The data item declaration may be input as units of one character row, which is separated by a delimiter, instead of as units of one line. In this case, a comment line is skipped. In this embodiment, since the input program is coded in PL/I, the data item declaration can be easily identified by examining it to determine whether or not it is a character row that includes a declaration (DCL, DECLARE).

When it is ascertained that the input data item declaration line is the beginning of a data definition block, a check is performed to determine whether or not the data item re-defines another data item (block 707). In this embodiment, since the input program is coded in PL/I, the data item can be easily identified by examining it to determine whether or not it is a character row that includes re-definition data (DEF, DEFINED).

When it is ascertained that the data item does not re-define another data item, both the offset and the level of its data item name are set to further smaller values, as in TOP_REC in FIG. 4. In this processing, the offset and the level values are initialized (step 709). When it is ascertained that the data item re-defines another data item, its data item name, as well as REDEF_F in FIG. 4, must be displayed at the same offset as is the offset of F2, which is re-defined by REDEF_F, and must be displayed at a level that is higher than that of the preceding data field definition block 133. Therefore, the offset value of the re-defined data item is set as the offset, and a maximum level value of the preceding data field definition block, or the value obtained by adding a constant to the maximum value, is set as the level (step 711). Then, the addition process for a data item in a lower structure, which will be described later, is performed (step 713).

FIG. 22 is a flowchart of the addition processing for a data item in a lower structure. The processing is begun at step 731. First, the level is incremented (step 733). A data item structure that corresponds to data items is formed from data that are received through the main routine, and the offset level, etc., are set (step 735). More specifically, the entry 300 for a structure corresponding to the data items shown in FIG. 5 is prepared for each data item. Then, the data item data are added at the end of the line data list (step 737). A check is performed to determine whether or not the input data item declaration is the lowermost (step 739). This determination can be easily performed by examining the data item declaration to determine whether or not it includes the attribute data and the size data.

When the data item declaration is located at the lowermost position, a check is performed by examining a relationship between the offset and the data size to determine whether or not the alignment of boundaries is required (step 747). In other words, a check is performed to determine whether or not the alignment process is required, as is explained while referring to FIGS. 11 through 13. When it is ascertained that this process is required, the offset value of the offset line is changed into a value obtained while boundary matching is taken into consideration (step 749). A dummy data item that is not to be displayed is added to the list (step 751). That is, a new data item declaration is entered. When there is no line head that indicates the beginning of the following line data, a line head is added (step 753).

When, at step 739, it is ascertained that the data item declaration is not the lowermost, the addition of a data item in a lower structure to the line data is recursively repeated (step 741). The size data addition process is performed so that the total value of the size data of the lower data items is acquired as the size data in the upper data items (step 743). The above described process is repeated for a lower structure (step 745).

Sequentially, a check is performed to determine whether or not the data item is a data item included in the array (step 755). When it is ascertained the data item is one that is included in the array, data item data that correspond to ":" are added to the line data, and the size data are set equal to the size of the entire array (step 757). A line head is added if it is not present (step 759). The addition of the size data is performed so that the size data of the data items is set as the total value of the size data of the data items in the lower structure (step 763).

As is described above, according to the present invention, it is possible to precisely express, for each data item, a range that each data item occupies in a memory area, a hierarchical relationship between data items, the re-definition of a data item, the shared use of a data area situated between the data items, and a data array and its size. Therefore, a programmer can visually and intuitively understand a correct data structure, and mistakes made during the coding of a program and erroneous maintenance coding can be reduced.

According to one of the aspects of the present invention, since a detailed display for each level is omitted, the data alignment and the overlapping of the data fields of even a large data structure can be recognized at a glance.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method, performed by a computer, for displaying data structures used by a program stored in said computer and defined by a data field definition having a plurality of data field definition blocks, said data field definition blocks comprising a plurality of data items, said data items including data item names, data item hierarchy data and data item length data, said plurality of data field definition blocks comprising at least one first data field definition block and at least one re-definition data field definition block which re-defines a re-define data item of said first data field definition block by data item re-definition information, comprising the steps of:

(a) analyzing said data item hierarchical data of said first and said re-definition data field definition blocks, to correlate hierarchies in said first and said re-definition data field definition blocks to provide data structure information of said data items;

(b) analyzing said data item re-definition information of said re-definition data field definition block, and correlating said data items of said first data field definition block to be re-defined and said re-definition performed by said re-definition data field definition block, to link said data items to be re-defined and said data item entries that correspond to said data items to be re-defined;

(c) calculating, based on said data item length data, data item offset data for each of said data items included in said first data field definition block, and adding said data item offset data to said data item entries;

(d) calculating, based on said data item length data, said data item re-definition information and said re-defined data item offset data, data item offset data for each of said data items included in said re-definition data field definition block, and adding said data item offset data to said data item entries; and (e) displaying, as a single line and arranged laterally, said data item names of said data items, which are included in said first and said re-definition data field definition blocks that comprise said offset data having the same offset, said re-definition data item name arranged laterally with respect to said first data item name.

2. The method of claim 1, wherein said displaying step comprises the steps of:

(f) setting line data, such that said data item names of said data items, which are included in said first and said re-definition data field definition blocks, that include data item offset data having the same offset, comprise a single line in hierarchical data order of said data items, and are arranged laterally, said re-definition data item names are arranged laterally with respect to said first data item names;

(g) correlating position data indicating locations, at which said data item names are to be displayed, with said data item names that are included in said line data; and (h) displaying said data item names, included in said line data, at said locations designated by said position data.

3. The method of claim 2, comprising the additional steps of:

(i) adding a numeral at the beginning of said display of said line data indicating said offset of said line; and (j) adding line data which includes no data item after said line so as to display a lateral line in the line subsequent to said line, representing a border between ranges occupied by said data items.

4. The method of claim 1, wherein:

said analyzing steps are initiated by a user selection of a data item for analysis.

5. The method of claim 1, for displaying a convoluted said data structure, wherein said displaying step additionally comprises:

(k) not displaying any said data item names of said first and said re-definition data items to be convoluted on the same ones of said lines, including not displaying lines having only said non-displayed data items; and (l) displaying a convolution indicator in said single line in place of said non-displayed said first and said redefinition data item names and lines.

6. A method for displaying a data structure of a computer program, which computer program is defined by a data field definition having a plurality of data field definition blocks, said data field definition blocks comprising a plurality of data items, said data items including data item names, data item hierarchy data and data item length data, said plurality of data field definition blocks comprising at least one first data field definition block and at least one re-definition data field definition block which re-defines a re-define data item of said first data field definition block by data item re-definition information, comprising the steps of:

(a) analyzing said data items of said first data field definition block to calculate data item offset data for each of said data items, based on said data item length data;

(b) analyzing said data item re-definition information of said re-definition data field definition block and correlating with said data items of said first data field definition block to calculate data item offset data for each of said data items in said re-definition data field definition block, based on said data item length data and said calculated offset data for said re-defined data items; and (c) displaying, as a single line and arranged laterally, said data item names of said data items, which are included in said first and said re-definition data field definition blocks, that include offset data having the same offset, said re-definition data item name arranged laterally with respect to said first data item name.

7. The method of claim 6, for displaying a convoluted said data structure, wherein said displaying step additionally comprises:

(d) not displaying any said data item names of said first and said re-definition data items to be convoluted on the same ones of said lines, including not displaying lines having only said non-displayed first and said re-definition data items; and (e) displaying a convolution indicator in said single line in place of said non-displayed first and said re-definition data item names and lines.

8. The method of claim 6, wherein:

(f) said analyzing steps additionally comprise analyzing said data item hierarchical data to determine the hierarchical order of said first and said re-definition data items; and (g) said displaying step additionally comprises displaying said data item names of said first and said re-definition data items in said hierarchical order.

9. The method of claim 8, for displaying a convoluted said data structure, wherein said convolution is designated on a hierarchical basis, wherein said displaying step additionally comprises:

(h) checking said data item hierarchical data for said first and said re-definition data items of said lines against said hierarchical basis;

(i) not displaying any said data item names of said first and said re-definition data items to be convoluted on the same ones of said lines, based on said hierarchical data check, including not displaying lines having only said non-displayed data items; and (j) displaying a convolution indicator in said single line in place of said non-displayed said first and said re-definition data item names and lines.

10. The method of claim 6, comprising the additional steps of:

(k) adding a numeral at the beginning of said display of said line data indicating said offset of said line; and (l) adding line data which includes no data item after said single line so as to display a lateral line in the line subsequent to said single line, representing a border between ranges occupied by said data items.

11. The method of claim 6, wherein:

said analyzing steps are initiated by a user selection of a data item for analysis.

12. A computer program product for operating a computer system for displaying data structures used by a program stored in said computer and defined by a data field definition having a plurality of data field definition blocks, said data field definition blocks comprising a plurality of data items, said data items including data item names, data item hierarchy data and data item length data, said plurality of data field definition blocks comprising at least one first data field definition block and at least one re-definition data field definition block which re-defines a re-define data item of said first data field definition block by data item re-definition information, said computer program product comprising a storage medium having computer-readable program code embodied in said medium for causing the computer system to:

(a) analyze said data item hierarchical data of said first and said re-definition data field definition blocks, to correlate hierarchies in said first and said re-definition data field definition blocks to provide data structure information of said data items;

(b) analyze said data item re-definition information of said re-definition data field definition block, and correlate said data items of said first data field definition block to be re-defined and said re-definition performed by said re-definition data field definition block, to link said data items to be re-defined and said data item entries that correspond to said data items to be re-defined;

(c) calculate, based on said data item length data, data item offset data for each of said data items included in said first data field definition block, and add said data item offset data to said data item entries;

(d) calculate, based on said data item length data, said data item re-definition information and said re-defined data item offset data, data item offset data for each of said data items included in said re-definition data field definition block, and add said data item offset data to said data item entries; and (e) display, as a single line and arranged laterally, said data item names of said data items, which are included in said first and said re-definition data field definition blocks that comprise said offset data having the same offset, said re-definition data item name arranged laterally with respect to said first data item name.

13. The computer program product of claim 12, wherein said computer-readable program code additionally causes the computer system to:

(f) set line data, such that said data item names of said data items, which are included in said first and said re-definition data field definition blocks, that include data item offset data having the same offset, comprise a single line in hierarchical data order of said data items, and are arranged laterally, said re-definition data item names are arranged laterally with respect to said first data item names;

(g) correlate position data indicating locations, at which said data item names are to be displayed, with said data item names that are included in said line data; and (h) display said data item names, included in said line data, at said locations designated by said position data.

14. The computer program product of claim 13, wherein said computer-readable program code additionally causes the computer system to:

(i) add a numeral at the beginning of said display of said line data indicating said offset of said line; and (j) add line data which includes no data item after said single line so as to display a lateral line in the line subsequent to said single line, representing a border between ranges occupied by said data items.

15. The computer program product of claim 12, for displaying a convoluted said data structure, wherein said computer-readable program code additionally causes the computer system to:

(k) not display any said data item names of said first and said re-definition data items to be convoluted on the same ones of said lines, including not displaying lines having only said non-displayed data items; and (l) display a convolution indicator in said single line in place of said non-displayed said first and said re-definition data item names and lines.

16. An article of manufacture for use in a computer system for displaying data structures used by a program stored in said computer system and defined by a data field definition having a plurality of data field definition blocks, said data field definition blocks comprising a plurality of data items, said data items including data item names, data item hierarchy data and data item length data, said plurality of data field definition blocks comprising at least one first data field definition block and at least one re-definition data field definition block which re-defines a re-define data item of said first data field definition block by data item re-definition information, said article of manufacture comprising a computer-readable storage medium having a computer program embodied in said medium which may cause the computer system to:

(a) analyze said data item hierarchical data of said first and said second data field definition blocks, to correlate hierarchies in said first and said re-definition data field definition blocks to provide data structure information of said data items;

(b) analyze said data item re-definition information of said re-definition data field definition block, and correlate said data items of said first data field definition block to be re-defined and said re-definition performed by said re-definition data field definition block, to link said data items to be re-defined and said data item entries that correspond to said data items to be re-defined;

(c) calculate, based on said data item length data, data item offset data for each of said data items included in said first data field definition block, and add said data item offset data to said data item entries;

(d) calculate, based on said data item length data, said data item re-definition information and said re-defined data item offset data, data item offset data for each of said data items included in said re-definition data field definition block, and add said data item offset data to said data item entries; and (e) display, as a single line and arranged laterally, said data item names of said data items, which are included in said first and said re-definition data field definition blocks that comprise said offset data having the same offset, said re-definition data item name arranged laterally with respect to said first data item name.

17. The article of manufacture of claim 16, wherein said computer program embodied in said medium additionally may cause the computer system to:

(f) set line data, such that said data item names of said data items, which are included in said first and said re-definition data field definition blocks, that include data item offset data having the same offset, comprise a single line in hierarchical data order of said data items, and are arranged laterally, said re-definition data item names are arranged laterally with respect to said first data item names;

(g) correlate position data indicating locations, at which said data item names are to be displayed, with said data item names that are included in said line data; and (h) display said data item names, included in said line data, at said locations designated by said position data.

18. The article of manufacture of claim 17, wherein said computer program embodied in said medium additionally may cause the computer system to:

(i) add a numeral at the beginning of said display of said line data indicating said offset of said line; and (j) add line data which includes no data item after said single line so as to display a lateral line in the line subsequent to said single line, representing a border between ranges occupied by said data items.

19. The article of manufacture of claim 16, for displaying a convoluted said data structure, wherein said computer program embodied in said medium additionally may cause the computer system to:

(k) not display any said data item names of said first and said re-definition data items to be convoluted on the same ones of said lines, including not displaying lines having only said non-displayed data items; and (l) display a convolution indicator in said single line in place of said non-displayed said first and said re-definition data item names and lines.

* * * * *